US012776321B2

(12) United States Patent
Smith et al.

(10) Patent No.: US 12,776,321 B2
(45) **Date of Patent: *Oct. 27, 2026**

(54) VOICE DETECTION OPTIMIZATION BASED ON SELECTED VOICE ASSISTANT SERVICE

(71) Applicant: Sonos, Inc., Goleta, CA (US)

(72) Inventors: Connor Kristopher Smith, New Hudson, MI (US); Kurt Thomas Soto, Ventura, CA (US); Charles Conor Sleith, Waltham, MA (US)

(73) Assignee: Sonos, Inc., Goleta, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 18/952,061

(22) Filed: Nov. 19, 2024

(65) Prior Publication Data

US 2025/0140260 A1 May 1, 2025

Related U.S. Application Data

(63) Continuation of application No. 18/345,588, filed on Jun. 30, 2023, now Pat. No. 12,165,651, which is a (Continued)

(51) Int. Cl.
*G10L 15/30* (2013.01)
*G10L 15/08* (2006.01)

(Continued)

(52) U.S. Cl.
CPC .............. *G10L 15/30* (2013.01); *G10L 15/08* (2013.01); *G10L 15/22* (2013.01); *H04R 1/406* (2013.01);

(Continued)

(58) Field of Classification Search
CPC ......... G10L 15/30; G10L 15/08; G10L 15/22; G10L 2015/088; G10L 21/0208; G10L 2021/02166; G10L 2015/223; H04R 1/406; H04R 3/005; H04R 27/00; H04R 29/005; H04R 2227/001; H04R 2227/005; H04R 2420/07; H04R 29/004; H04S 7/305

(Continued)

(56) References Cited

U.S. PATENT DOCUMENTS 5,857,172 A * 1/1999 Rozak ........................ G06F 3/16
704/E15.04
8,340,975 B1 * 12/2012 Rosenberger ........... G10L 15/22
704/274

(Continued)

*Primary Examiner* — Thuykhanh Le
(74) *Attorney, Agent, or Firm* — Fortem IP LLP

(57) ABSTRACT

Systems and methods for optimizing voice detection via a network microphone device (NMD) based on a selected voice-assistant service (VAS) are disclosed herein. In one example, the NMD detects sound via individual microphones and selects a first VAS to communicate with the NMD. The NMD produces a first sound-data stream based on the detected sound using a spatial processor in a first configuration. Once the NMD determines that a second VAS is to be selected over the first VAS, the spatial processor assumes a second configuration for producing a second sound-data stream based on the detected sound. The second sound-data stream is then transmitted to one or more remote computing devices associated with the second VAS.

20 Claims, 11 Drawing Sheets

Related U.S. Application Data continuation of application No. 17/303,735, filed on Jun. 7, 2021, now Pat. No. 11,727,936, which is a continuation of application No. 16/798,967, filed on Feb. 24, 2020, now Pat. No. 11,031,014, which is a continuation of application No. 16/434,426, filed on Jun. 7, 2019, now Pat. No. 10,573,321, which is a continuation of application No. 16/141,875, filed on Sep. 25, 2018, now Pat. No. 10,811,015.

(51) Int. Cl.
*G10L 15/22* (2006.01)
*H04R 1/40* (2006.01)
*H04R 3/00* (2006.01)

(52) U.S. Cl.
CPC ........ *H04R 3/005* (2013.01); *G10L 2015/088* (2013.01)

(58) Field of Classification Search
USPC .......................................................... 704/251
See application file for complete search history.

(56) References Cited

U.S. PATENT DOCUMENTS 8,452,597 B2 * 5/2013 Bringert .................. G10L 17/02 704/251
8,762,156 B2 * 6/2014 Chen ..................... G10L 15/183 704/265
9,672,812 B1 * 6/2017 Watanabe ............... G10L 15/22
9,691,384 B1 * 6/2017 Wang ...................... G10L 15/22
10,304,440 B1 * 5/2019 Panchapagesan ....... G10L 15/08
10,586,534 B1 * 3/2020 Argyropoulos ......... G10L 15/22
10,825,451 B1 * 11/2020 Yavagal ................ G10L 15/183
11,062,705 B2 * 7/2021 Watanabe ............... G10L 15/22
11,694,679 B2 * 7/2023 Yavagal ................ G10L 15/183 704/251
2002/0055950 A1 * 5/2002 Witteman ............... G06F 16/40 707/E17.009
2004/0153321 A1 * 8/2004 Chung .................... G10L 15/22 704/E15.04
2009/0013255 A1 * 1/2009 Yuschik .................. G06F 3/048 715/728
2009/0326949 A1 * 12/2009 Douthitt ................ H04L 67/568 707/999.001
2013/0080167 A1 * 3/2013 Mozer ..................... G10L 15/22 704/E17.001
2013/0283169 A1 * 10/2013 Van Wie ............. G06F 3/04815 715/728
2013/0289994 A1 * 10/2013 Newman ................. G10L 15/22 704/E15.005
2013/0339028 A1 * 12/2013 Rosner .................... G10L 15/22 704/E11.001
2014/0188476 A1 * 7/2014 Li ......................... G10L 15/222 704/254
2015/0039303 A1 * 2/2015 Lesso ...................... G10L 15/28 704/233
2015/0039310 A1 * 2/2015 Clark .................... G10L 15/063 704/244
2015/0039311 A1 * 2/2015 Clark ...................... G10L 25/84 704/244
2015/0154953 A1 * 6/2015 Bapat ...................... G10L 15/06 704/251
2016/0027440 A1 * 1/2016 Gelfenbeyn ............ G10L 15/02 704/244
2016/0148612 A1 * 5/2016 Guo ...................... G06F 40/237 704/257
2016/0155443 A1 * 6/2016 Khan ...................... G06F 3/167 704/275
2017/0084278 A1 * 3/2017 Jung ....................... G10L 17/02
2017/0103754 A1 * 4/2017 Higbie .................... G06F 3/165
2017/0110130 A1 * 4/2017 Sharifi ................ G10L 15/1815
2018/0061409 A1 * 3/2018 Valentine ................ G10L 15/20
2018/0137857 A1 * 5/2018 Zhou ....................... G10L 15/16
2018/0336892 A1 * 11/2018 Kim ....................... H04R 3/005
2018/0350356 A1 * 12/2018 Garcia .................... G10L 15/20
2018/0350379 A1 * 12/2018 Wung ................... G10L 21/038
2018/0352334 A1 * 12/2018 Family ................... H04R 1/403
2018/0359364 A1 * 12/2018 Gunther .............. H04M 3/5191
2019/0013019 A1 * 1/2019 Lawrence ........... G10L 15/1815
2019/0035404 A1 * 1/2019 Gabel ..................... G10L 15/22
2019/0073999 A1 * 3/2019 Prémont ................. G10L 15/08
2019/0104373 A1 * 4/2019 Wodrich .............. H04R 29/001
2019/0122662 A1 * 4/2019 Chang ..................... G10L 15/05
2019/0156847 A1 * 5/2019 Bryan ................. G10L 21/0232
2019/0237069 A1 * 8/2019 Zhao ....................... G06F 40/55
2019/0237089 A1 * 8/2019 Shin ................. H04N 21/42204
2019/0251960 A1 * 8/2019 Maker ..................... G10L 15/22
2019/0287536 A1 * 9/2019 Sharifi .................... G10L 15/22
2019/0311715 A1 * 10/2019 Pfeffinger ............... G10L 15/22
2019/0311718 A1 * 10/2019 Huber ..................... G10L 15/22
2019/0311722 A1 * 10/2019 Caldwell ................. G10L 17/24
2019/0318729 A1 * 10/2019 Chao ....................... G10L 15/14
2019/0325870 A1 * 10/2019 Mitic ...................... G10L 15/22
2019/0325888 A1 * 10/2019 Geng .................. G10L 21/0216
2019/0341038 A1 * 11/2019 Bromand ................ G06F 3/167
2019/0371324 A1 * 12/2019 Powell .................... G10L 15/22
2019/0392832 A1 * 12/2019 Mitsui ..................... G10L 15/00
2020/0020322 A1 * 1/2020 Guevara ................. G10L 15/16
2020/0090646 A1 * 3/2020 Smith ..................... G10L 15/22
2020/0098386 A1 * 3/2020 Smith ................. G10L 21/0208
2020/0135194 A1 * 4/2020 Jeong ...................... G10L 17/12
2022/0036882 A1 * 2/2022 Ahn ........................ G10L 15/08
2022/0083136 A1 * 3/2022 Deleeuw ................. G10L 15/22
2023/0169979 A1 * 6/2023 Civelli .................... G10L 15/32 704/275

* cited by examiner

VOICE DETECTION OPTIMIZATION BASED ON SELECTED VOICE ASSISTANT SERVICE

CROSS-REFERENCE TO RELATED APPLICATIONS

The present application is a continuation of U.S. patent application Ser. No. 18/345,588, filed Jun. 30, 2023, now U.S. Pat. No. 12,165,651, which is a continuation of U.S. patent application Ser. No. 17/303,735, filed Jun. 7, 2021, now U.S. Pat. No. 11,727,936, which is a continuation of U.S. patent application Ser. No. 16/798,967, filed Feb. 24, 2020, now U.S. Pat. No. 11,031,014, which is a continuation of U.S. application Ser. No. 16/434,426, filed Jun. 7, 2019, now U.S. Pat. No. 10,573,321, which is a continuation of U.S. application Ser. No. 16/141,875, filed on Sep. 25, 2018, now U.S. Pat. No. 10,811,015, each of which is incorporated herein by reference in its entirety.

TECHNICAL FIELD

The present technology relates to consumer goods and, more particularly, to methods, systems, products, features, services, and other elements directed to voice-controllable media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1A:
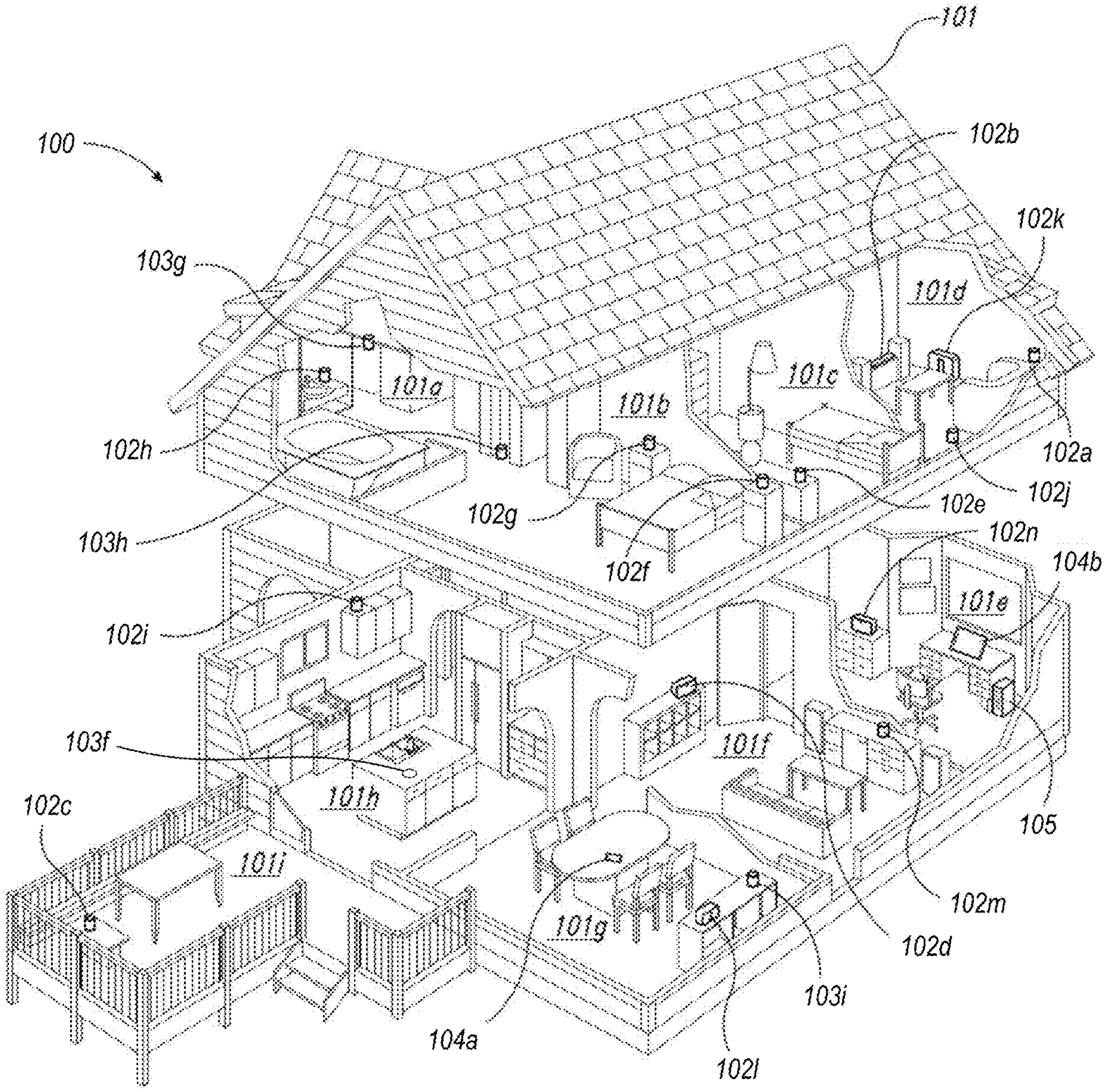
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element *103a* is first introduced and discussed with reference to FIG. 1A.

DETAILED DESCRIPTION

I. Overview

Voice control can be beneficial in a "smart" home that includes smart appliances and devices that are connected to a communication network, such as wireless audio playback devices, illumination devices, and home-automation devices (e.g., thermostats, door locks, etc.). In some implementations, network microphone devices may be used to control smart home devices.

A network microphone device ("NMD") is a networked computing device that typically includes an arrangement of microphones, such as a microphone array, that is configured to detect sounds present in the NMD's environment. The detected sound may include a person's speech mixed with background noise (e.g., music being output by a playback device or other ambient noise). In practice, an NMD typically filters detected sound to remove the background noise from the person's speech to facilitate identifying whether the speech contains a voice input indicative of voice control. If so, the NMD may take action based on such a voice input.

An NMD often employs a wake-word engine, which is typically onboard the NMD, to identify whether sound detected by the NMD contains a voice input that includes a particular wake word. The wake-word engine may be configured to identify (i.e., "spot") a particular wake word using one or more identification algorithms. This wake-word identification process is commonly referred to as "keyword spotting." In practice, to help facilitate keyword spotting, the NMD may buffer sound detected by a microphone of the NMD and then use the wake-word engine to process that buffered sound to determine whether a wake word is present.

When a wake-word engine spots a wake word in detected sound, the NMD may determine that a wake-word event (i.e., a "wake-word trigger") has occurred, which indicates that the NMD has detected sound that includes a potential voice input. The occurrence of the wake-word event typically causes the NMD to perform additional processes involving the detected sound. In some implementations, these additional processes may include outputting an alert (e.g., an audible chime and/or a light indicator) indicating that a wake word has been identified and extracting detected-sound data from a buffer, among other possible additional processes. Extracting the detected sound may include reading out and packaging a stream of the detected-sound according to a particular format and transmitting the packaged sound-data to an appropriate VAS for interpretation.

In turn, the VAS corresponding to the wake word that was identified by the wake-word engine receives the transmitted sound data from the NMD over a communication network. A VAS traditionally takes the form of a remote service implemented using one or more cloud servers configured to process voice inputs (e.g., AMAZON's ALEXA, APPLE's SIRI, MICROSOFT's CORTANA, GOOGLE'S ASSISTANT, etc.). In some instances, certain components and functionality of the VAS may be distributed across local and remote devices. Additionally, or alternatively, a VAS may take the form of a local service implemented at an NMD or a media playback system comprising the NMD such that a voice input or certain types of voice input (e.g., rudimentary commands) are processed locally without intervention from a remote VAS.

In any case, when a VAS receives detected-sound data, the VAS will typically process this data, which involves identifying the voice input and determining an intent of words captured in the voice input. The VAS may then provide a response back to the NMD with some instruction according to the determined intent. Based on that instruction, the NMD may cause one or more smart devices to perform an action. For example, in accordance with an instruction from a VAS, an NMD may cause a playback device to play a particular song or an illumination device to turn on/off, among other examples. In some cases, an NMD, or a media system with NMDs (e.g., a media playback system with NMD-equipped playback devices) may be configured to interact with multiple VASes. In practice, the NMD may select one VAS over another based on the particular wake word identified in the sound detected by the NMD.

In some implementations, a playback device that is configured to be part of a networked media playback system may include components and functionality of an NMD (i.e., the playback device is "NMD-equipped"). In this respect, such a playback device may include a microphone that is configured to detect sounds present in the playback device's environment, such as people speaking, audio being output by the playback device itself or another playback device that is nearby, or other ambient noises, and may also include components for buffering detected sound to facilitate wake-word identification.

Some NMD-equipped playback devices may include an internal power source (e.g., a rechargeable battery) that allows the playback device to operate without being physically connected to a wall electrical outlet or the like. In this regard, such a playback device may be referred to herein as a "portable playback device." On the other hand, playback devices that are configured to rely on power from a wall electrical outlet or the like may be referred to herein as "stationary playback devices," although such devices may in fact be moved around a home or other environment. In practice, a person might often take a portable playback device to and from a home or other environment in which one or more stationary playback devices remain.

In some cases, multiple VASES are configured for the NMD, or a system of NMDs (e.g., a media playback system of playback devices). One or more services can be configured during a set-up procedure, and additional VASes can be configured for the system later on. As such, the NMD acts as an interface with multiple VASes, perhaps alleviating a need to have an NMD from each of the voice services to interact with the respective VASes. Yet further, the NMD can operate in concert with service-specific NMDs present in a household to process a given voice command.

Where two or more VASes are configured for the NMD, a particular VAS can be invoked by utterance of a wake word corresponding to the particular VAS. For instance, in querying AMAZON, a user might speak the wake word "Alexa" followed by a voice command. Other examples include "Ok, Google" for querying GOOGLE and "Hey, Siri" for querying APPLE.

In some cases, a generic wake word can be used to indicate a voice input to an NMD. In some cases, this is a manufacturer-specific wake word rather than a wake word tied to any particular VAS (e.g., "Hey, Sonos" where the NMD is a SONOS playback device). Given such a wake word, the NMD can identify a particular VAS to process the request. For instance, if the voice input following the wake word is related to a particular type of command (e.g., music playback), then the voice input is sent to a particular VAS associated with that type of command (e.g. a streaming music service having voice command capabilities).

An NMD can include an array of individual microphones. In operation, the NMD receives sound data from each of the individual microphones, which is then combined and processed to assess whether a wake word has been detected. As noted above, if the wake word has been detected, the NMD can pass subsequent audio input to a VAS for further processing. If one or more of the individual microphones suffers performance issues, the functionality of the network microphone device may be impaired. Individual microphones may be impaired due to hardware problems with the microphone itself (e.g., damage or defect to one or more of the components of the microphone) or due to obstructions blocking audio from reaching the microphone (e.g., dust blocking a microphone port in the NMD, a piece of furniture partially blocking one of the microphones, etc.). Problems with one or more of the individual microphones can lead to aberrant audio signals, for example audio signals exhibiting excess noise, distortion, bandwidth limitations, or other artifacts that can deleteriously affect downstream processing. This deterioration in audio quality may lead to poor performance at the VAS, for example, inability to accurately capture and respond to voice commands.

In addition to problems with microphone performance, environmental factors can deleteriously affect the downstream processing of sound data obtained by the NMD. For example, if a household appliance generates a high level of background noise, the false-positive or false-negative rate of wake-word detection can increase. As another example, if individual users in a household tend to be relatively quiet and speak in softer voices, the NMD may perform more sub-optimally in detecting and correctly analyzing voice input. In such instances, one or more parameters of the NMD can be adjusted to improve performance of the NMD. For example, the fixed gain may be adjusted for a household of soft speakers, or a particular frequency band corresponding to the identified white noise of a household appliance might be ignored or filtered from the detected sound data before downstream processing. Spatial processing could also be adjusted to suppress noise coming from a particular direction (for example, from a stationary household appliance). By modifying performance of the NMD based on detected characteristics of the audio data, voice detection and downstream processing can be improved.

In some embodiments, the NMD provides sound metadata (e.g., spectral data, signal levels, direction detection, etc.) to a remote computing device for evaluation. To protect user privacy, it can be useful to rely only on sound metadata that does not reveal the original audio content (e.g., the content of recorded speech input or other detected sound data). The NMD can derive the sound metadata from the detected sound data in a manner that renders the original audio signal indecipherable if one only has access to the sound metadata. For example, by limiting the sound metadata to frequency-domain information that is averaged over many sampling frames, rather than time-domain information, the NMD can render the original detected sound data indecipherable via the sound metadata. In operation, the NMD can gather sound metadata and send this metadata to one or more computing devices of a remote evaluator for evaluation and comparison. The remote evaluator can then evaluate the sound metadata to identify any features of the sound metadata indicative of problematic microphones, environmental factors, or other factors that may contribute to diminished NMD performance. As such, in some embodiments, the system can detect obstacles to NMD performance without infringing on user privacy by sending recorded audio content to the remote evaluator.

In some embodiments, the system takes corrective measures in response to detecting abnormalities in the sound metadata. For example, the NMD can modify its operation to accommodate a defective microphone or to compensate for detected environmental factors. This modification can include disregarding input from one or more microphones, modifying an acoustic echo cancellation processing algorithm, modifying a spatial processing algorithm, adjusting a fixed gain of one or more of the microphones, adjusting a wake-word sensitivity parameter, adjustment of noise-reduction parameters, or making other modifications to the operation of the NMD.

In addition, in some instances it can be advantageous to modify operation of the NMD based on the particular voice assistant service (VAS) selected. As noted previously, an NMD or a system of NMDs (e.g., a media playback system of playback devices) can be configured to communicate with a plurality of different VASes. In operation, voice input obtained via microphones of the NMD can be transmitted to one or more selected VASes for processing. Different VASes may process the received sound data differently, and accordingly operation of the NMD may be modified to optimize voice detection for the particular VAS. For example, different VASes may utilize sound data from different numbers of microphones, and/or may use different techniques for wake-word detection and other voice processing. In one example, a first VAS may use sound data from six microphones and a beamforming algorithm configured for a six-microphone architecture, while a second VAS may use sound data from only two microphones and employ a different spatial processing algorithm. In such cases, it can be useful to modify one or more operating parameters of the NMD based on which of these two VASes is selected.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
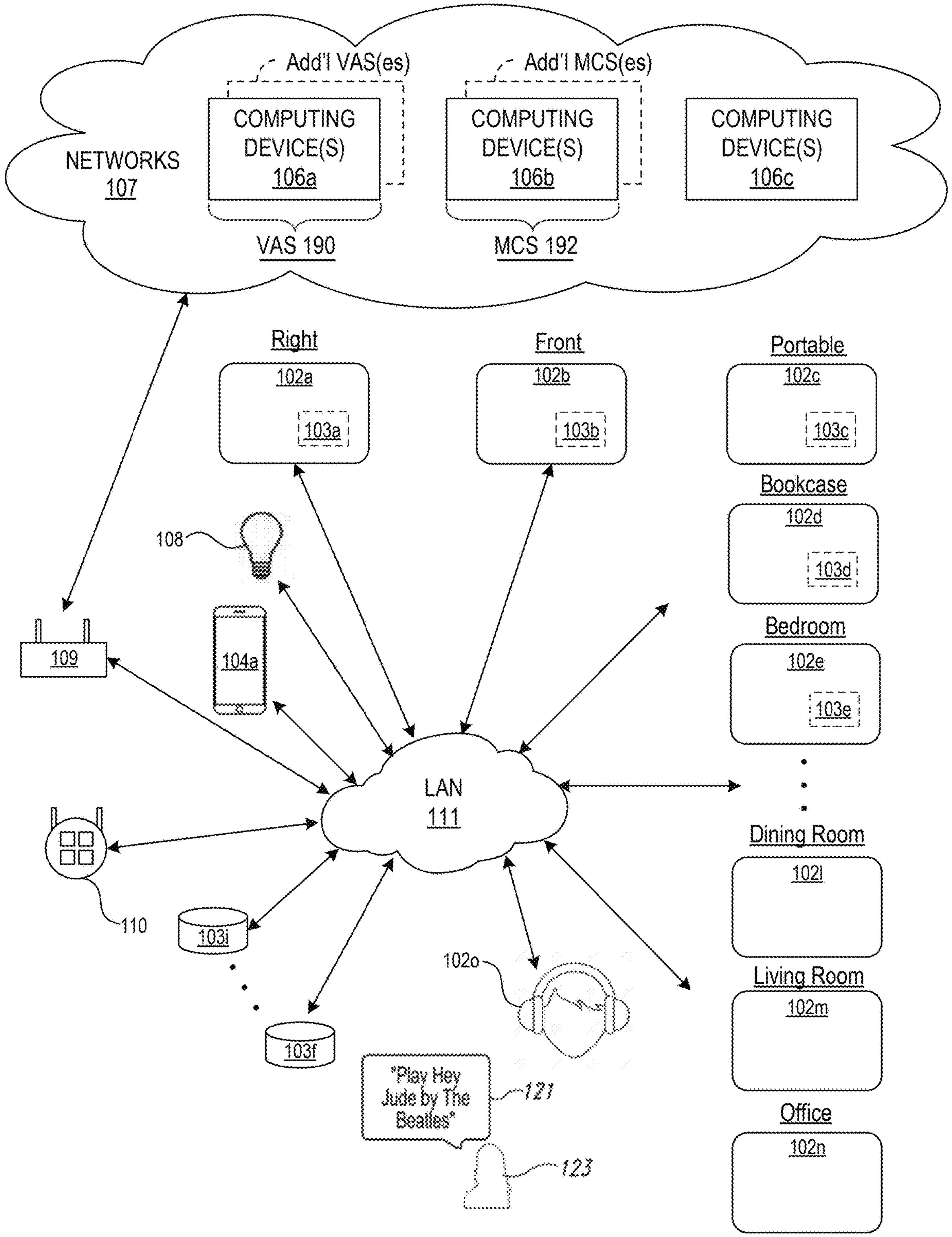
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101*a*, a master bedroom 101*b* (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102*a*-102*o*), network microphone devices 103 (identified individually as "NMDs" 103*a*-102*i*), and controller devices 104*a* and 104*b* (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102*o* (FIG. 1B) are a portable playback device, while the playback device 102*d* on the bookcase may be a stationary device. As another example, the playback device 102*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a LAN 111 including a network router 109. For example, the playback device 102*j* in the Den 101*d* (FIG. 1A), which may be designated as the "Left" device, may have a point-to-point connection with the playback device 102*a*, which is also in the Den 101*d* and may be designated as the "Right" device. In a related embodiment, the Left playback device 102*j* may communicate with other network devices, such as the playback device 102*b*, which may be designated as the "Front" device, via a point-to-point connection and/or other connections via the LAN 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106*a* are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 102 may take the form of or include an on-board (e.g., integrated) network microphone device. For example, the playback devices 102*a-e* include or are otherwise equipped with corresponding NMDs 103*a-e*, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103*f* and 103*g* may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102*d* because it is physically situated on a bookcase. Similarly, the NMD 103*f* may be assigned the named "Island" because it is physically situated on an island countertop in the Kitchen 101*h* (FIG. 1A). Some playback devices may be assigned names according to a zone or room, such as the playback devices 102*e*, 102*l*, 102*m*, and 102*n*, which are named "Bedroom," "Dining Room," "Living Room," and "Office," respectively. Further, certain playback devices may have functionally descriptive names. For example, the playback devices 102*a* and 102*b* are assigned the names "Right" and "Front," respectively, because these two devices are configured to provide specific audio channels during media playback in the zone of the Den 101*d* (FIG. 1A). The playback device 102*c* in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the LAN 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102*d* in the environment 101 (FIG. 1A) is in relatively close proximity to the NMD-equipped Living Room playback device 102*m*, and both devices 102*d* and 102*m* may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103*f* in the Kitchen 101*h* (FIG. 1A) may be assigned to the Dining Room playback device 102*l*, which is in relatively close proximity to the Island NMD 103*f*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the LAN 111 (FIG. 1B) may be eliminated and the single playback device 102 and/or the single NMD 103 may communicate directly with the remote computing devices 106*a*-*d*. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
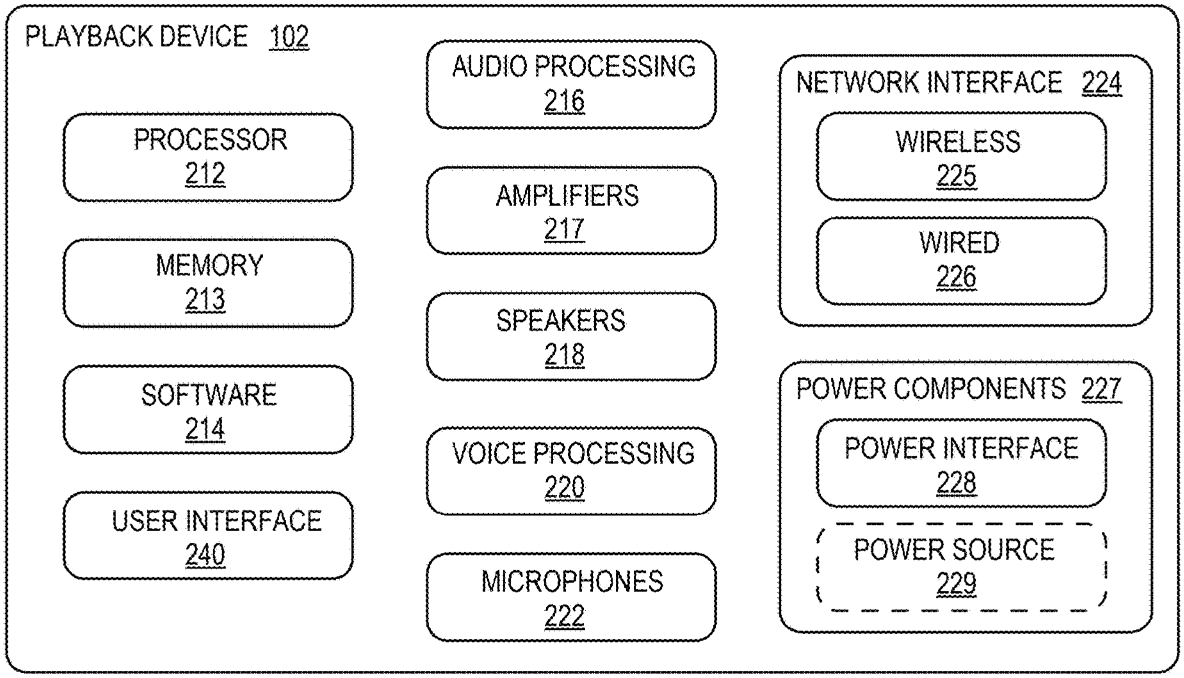
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device (s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously-referenced U.S. patent application Ser. No. 15/438,749.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
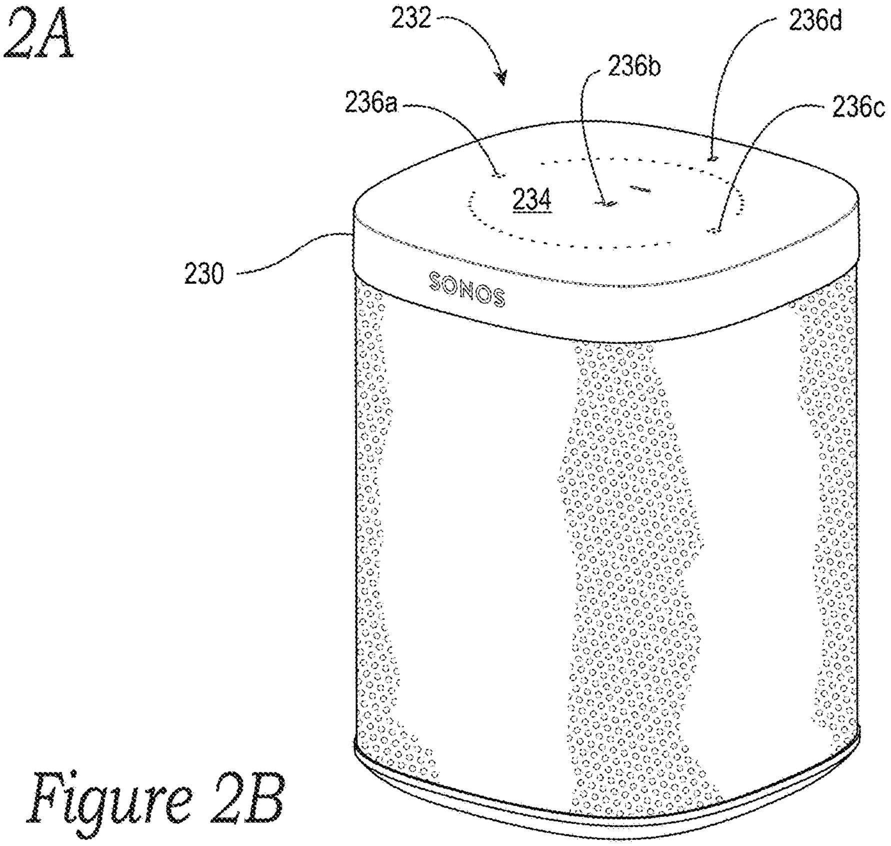
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236*a-c* for controlling audio playback, volume level, and other functions. The control area 232 also includes a button 236*d* for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT: AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the media playback system 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

Figure 3B:
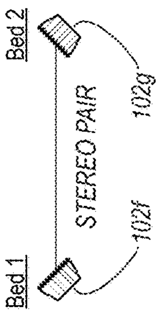
FIGS. 3A-3E are diagrams showing example playback device configurations in accordance with aspects of the disclosure.
Figure 3C:
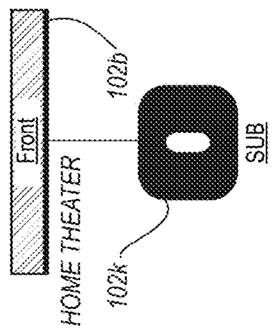
Figure 3D:
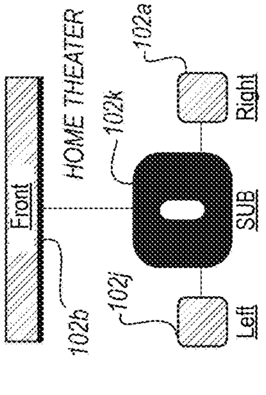
Figure 3E:
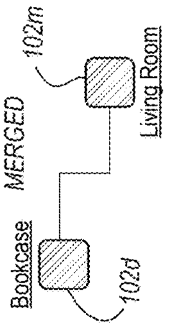
Figure 3A:
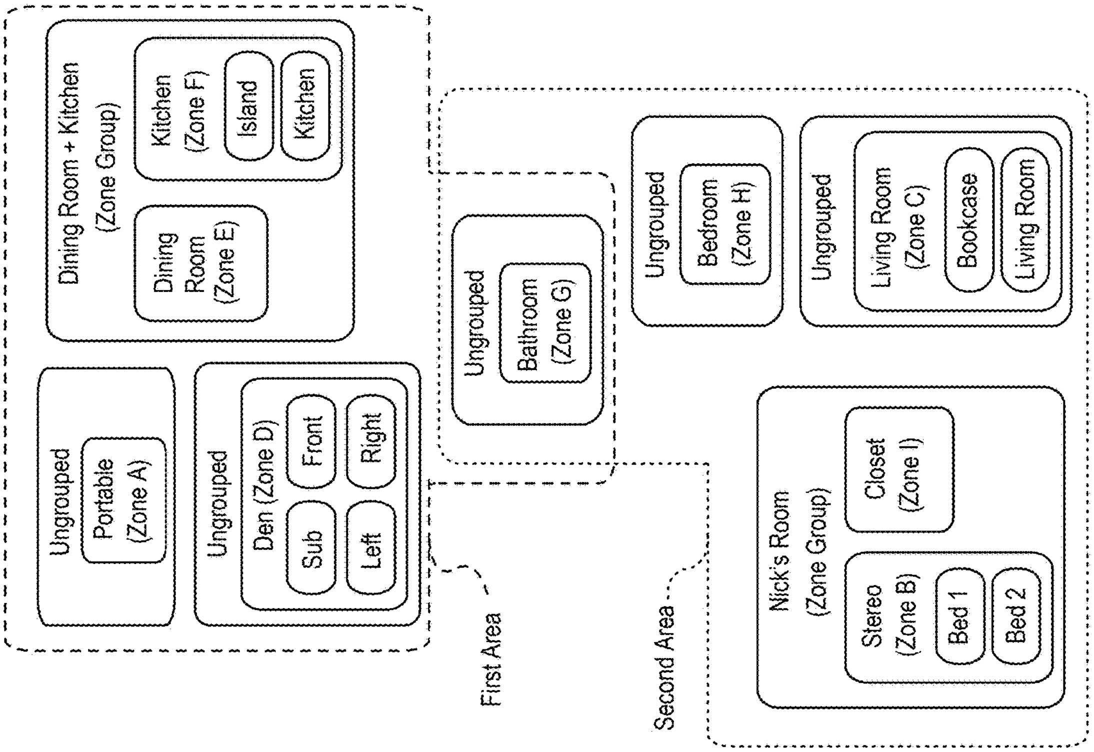

FIGS. 3A-3E show example configurations of playback devices. Referring first to FIG. 3A, in some example instances, a single playback device may belong to a zone. For example, the playback device 102*c* (FIG. 1A) on the Patio may belong to Zone A. In some implementations described below, multiple playback devices may be "bonded" to form a "bonded pair," which together form a single zone. For example, the playback device 102*f* (FIG. 1A) named "Bed 1" in FIG. 3A may be bonded to the playback device 102*g* (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102*d* named "Bookcase" may be merged with the playback device 102*m* named "Living Room" to form a single Zone C. The merged playback devices 102*d* and 102*m* may not be specifically assigned different playback responsibilities. That is, the merged playback devices 102*d* and 102*m* may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102*m* (as shown). In another example, Zone C may instead take on the name of the Bookcase device 102*d*. In a further example, Zone C may take on a name that is some combination of the Bookcase device 102*d* and Living Room device 102*m*. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102*f* in the master bedroom 101*h* (FIG. 1A) and the Bed 2 device may be the playback device 102*g* also in the master bedroom 101*h* (FIG. 1A).

As noted above, playback devices that are bonded may have different playback responsibilities, such as playback responsibilities for certain audio channels. For example, as shown in FIG. 3B, the Bed 1 and Bed 2 devices 102*f* and 102*g* may be bonded so as to produce or enhance a stereo effect of audio content. In this example, the Bed 1 playback device 102*f* may be configured to play a left channel audio component, while the Bed 2 playback device 102*g* may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102*b* named "Front" may be bonded with the playback device 102*k* named "SUB." The Front device 102*b* may render a range of mid to high frequencies, and the SUB device 102*k* may render low frequencies as, for example, a subwoofer. When unbonded, the Front device 102*b* may be configured to render a full range of frequencies. As another example, FIG. 3D shows the Front and SUB devices 102*b* and 102*k* further bonded with Right and Left playback devices 102*a* and 102*j*, respectively. In some implementations, the Right and Left devices 102*a* and 102*j* may form surround or "satellite" channels of a home theater system. The bonded playback devices 102*a*, 102*b*, 102*j*, and 102*k* may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102*d* and 102*m* in the Living Room merged, which would result in these devices being represented by the single UI entity of Zone C. In one embodiment, the playback devices 102*d* and 102*m* may playback audio in synchrony, during which each outputs the full range of audio content that each respective playback device 102*d* and 102*m* is capable of rendering.

In some embodiments, a stand-alone NMD may be in a zone by itself. For example, the NMD 103*h* from FIG. 1A is named "Closet" and forms Zone I in FIG. 3A. An NMD may also be bonded or merged with another device so as to form a zone. For example, the NMD device 103*f* named "Island" may be bonded with the playback device 102*i* Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102*c*, while another user may be preparing food in the Kitchen zone and listening to classical music being played by the playback device 102*i*. In another example, a playback zone may play the same audio content in synchrony with another playback zone. For instance, the user may be in the Office zone where the playback device 102*n* is playing the same hip-hop music that is being playing by playback device 102*c* in the Patio zone. In such a case, playback devices 102*c* and 102*n* may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102*c* from the Patio zone to the Office zone, the Office zone may now include both the playback devices 102*c* and 102*n*. In some cases, the user may pair or group the moved playback device 102*c* with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102*i* and 102*l* may render audio content in synchrony. As another example, bonded playback devices in the Den zone may be split into (i) a television zone and (ii) a separate listening zone. The television zone may include the Front playback device 102*b*. The listening zone may include the Right, Left, and SUB playback devices 102*a*, 102*j*, and 102*k*, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103*a* or 103*b* (FIG. 1B) to control the Den zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the MPS 100.

c. Example Controller Devices

Figure 4A:
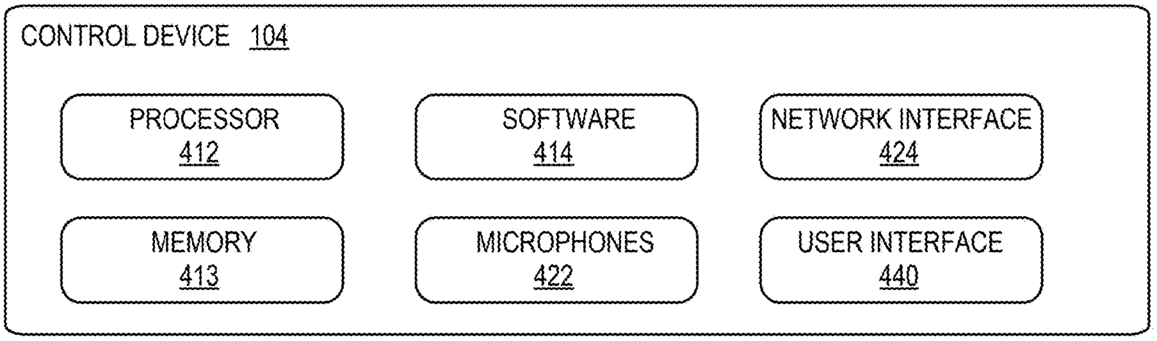
FIG. 4A is a functional block diagram of an example controller device in accordance with aspects of the disclosure.

FIG. 4A is a functional block diagram illustrating certain aspects of a selected one of the controller devices 104 of the MPS 100 of FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

Figure 4B:
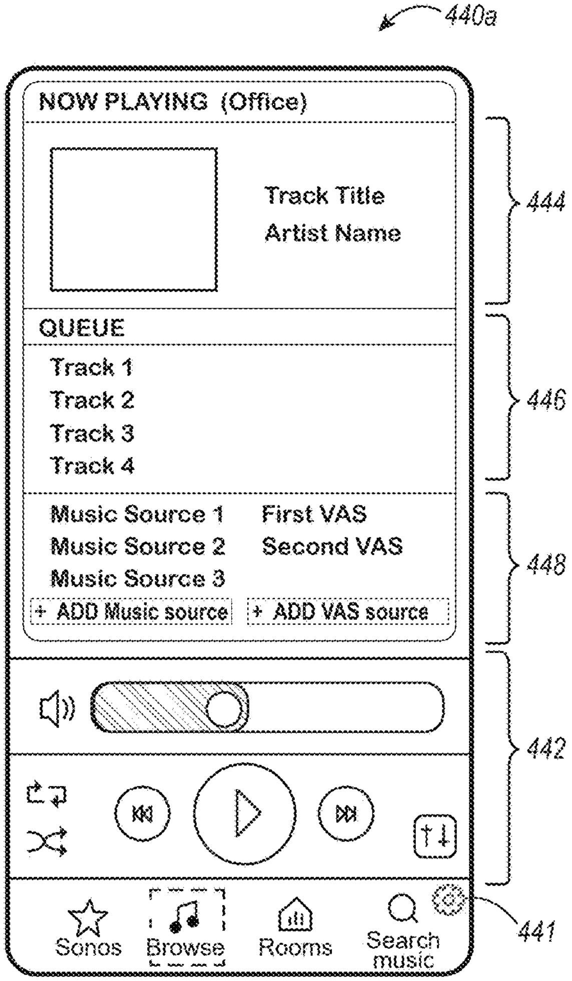
FIGS. 4B and 4C are controller interfaces in accordance with aspects of the disclosure.
Figure 4C:
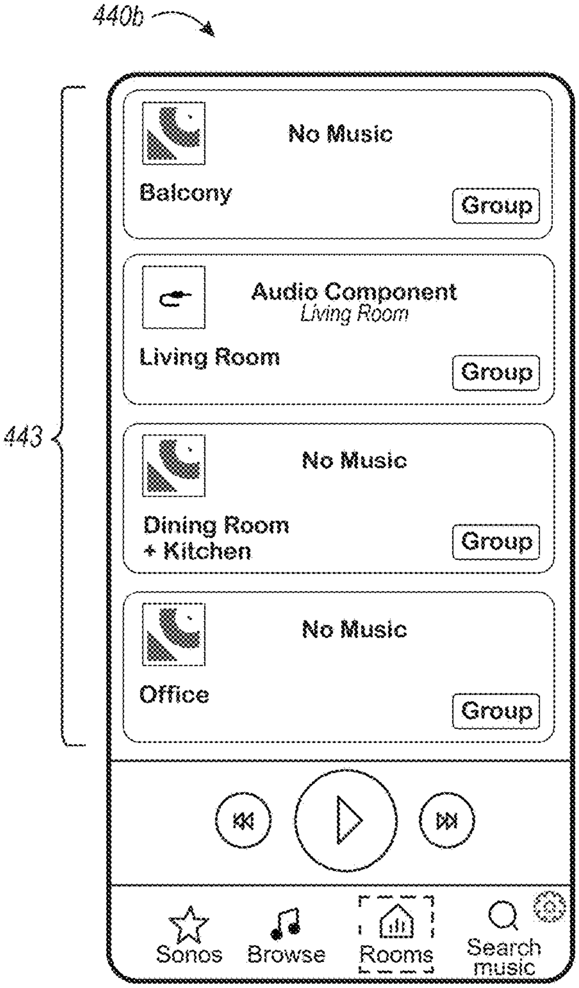

As shown in FIG. 4A, the controller device 104 also includes a user interface 440 that is generally configured to facilitate user access and control of the MPS 100. The user interface 440 may include a touch-screen display or other physical interface configured to provide various graphical controller interfaces, such as the controller interfaces 440*a* and 440*b* shown in FIGS. 4B and 4C. Referring to FIGS. 4B and 4C together, the controller interfaces 440*a* and 440*b* includes a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102*a* and 102*b* in the Living Room shown in FIG. 1A, and a second VAS to the NMD 103*f* in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

e. Example Network Microphone Devices

Figure 5:
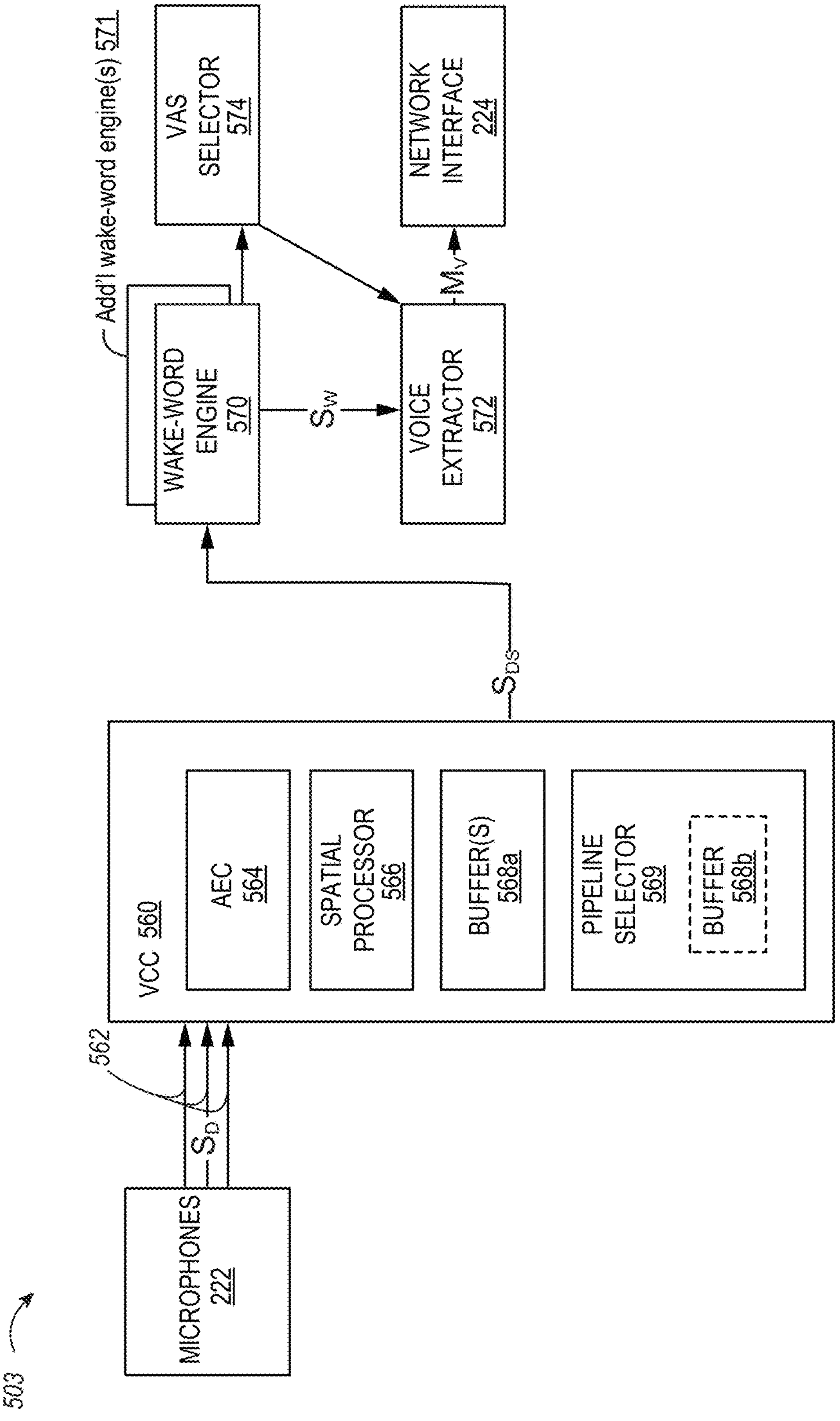
FIG. 5 is a functional block diagram of certain components of an example network microphone device in accordance with aspects of the disclosure.

FIG. 5 is a functional block diagram showing an NMD 503 configured in accordance with embodiments of the disclosure. The NMD 503 includes voice capture components ("VCC") 560, a wake-word engine 570, and at least one voice extractor 572, each of which is operably coupled to the VCC 560. The NMD 503 further includes the microphones 222 and the at least one network interface 224 described above and may also include other components, such as audio amplifiers, interface, etc., which are not shown in FIG. 5 for purposes of clarity.

The microphones 222 of the NMD 503 are configured to provide detected sound, $S_D$, from the environment of the NMD 503 to the VCC 560. The detected sound $S_D$ may take the form of one or more analog or digital signals. In example implementations, the detected sound $S_D$ may be composed of a plurality signals associated with respective channels 562 that are fed to the VCC 560.

Each channel 562 may correspond to a particular microphone 222. For example, an NMD having six microphones may have six corresponding channels. Each channel of the detected sound $S_D$ may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

As further shown in FIG. 5, the VCC 560 includes an AEC 564, a spatial processor 566, one or more buffers 568, and a pipeline selector 569. In operation, the AEC 564 receives the detected sound $S_D$ and filters or otherwise processes the sound to suppress echoes and/or to otherwise improve the quality of the detected sound $S_D$. That processed sound may then be passed to the spatial processor 566.

The spatial processor 566 is typically configured to analyze the detected sound $S_D$ and identify certain characteristics, such as a sound's amplitude (e.g., decibel level), frequency spectrum, directionality, etc. In one respect, the spatial processor 566 may help filter or suppress ambient noise in the detected sound $S_D$ from potential user speech based on similarities and differences in the constituent channels 562 of the detected sound $S_D$, as discussed above. As one possibility, the spatial processor 566 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 566 may be configured to determine a speech presence probability, examples of such functionality are disclosed in U.S. patent application Ser. No. 15/984,073, filed May 18, 2018, titled "Linear Filtering for Noise-Suppressed Speech Detection," which is incorporated herein by reference in its entirety.

In some embodiments, the spatial processor 566 is capable of assuming different configurations that perform differently. The different configurations can vary in the number of channels of sound data utilized, in the algorithms used to process the sound data, in the coefficients utilized for a particular algorithm, or in any other manner. In one example, the spatial processor 566 can utilize a beamforming algorithm in a first configuration and a linear filter algorithm in a second configuration.

As will be apparent to one of skill in the art, beamforming algorithms typically amplify sound coming from the direction where speech originated relative to the microphone array and attenuate sound coming from other relative directions. For example, utilizing beamforming, a microphone array can spatially localize sounds in two or three dimensions based on one or both of (i) delays in arrival times of a sound between the different microphones of the array, and (ii) vertical asymmetry of the relative response of each microphone in the array. In operation, some embodiments employ a polar response matrix including beamforming coefficients that represent differences in responses of each microphone of the array relative to every other microphone in the array.

In contrast to beamforming, a time-invariant linear filtering approach can enhance speech content from an acoustic signal by comparing estimated noise from different microphones of the NMD or of a microphone network. One example of such time-invariant linear filtering is multi-channel Weiner filtering and related techniques, as described in more detail in in U.S. patent application Ser. No. 15/984,073, filed May 18, 2018, titled "Linear Filtering for Noise-Suppressed Speech Detection," which is incorporated herein by reference in its entirety. Various other linear filtering approaches may be used in different embodiments.

The pipeline selector 569 can modify operation of the NMD based at least in part on the selected VAS. In some embodiments, the pipeline selector 569 toggles between different signal processing schemes depending on the particular VAS selected for communication with the NMD. For example, the pipeline selector 569 can modify operation of the spatial processor 566, such as selecting between a first configuration and a second configuration. The pipeline selector 569 may also determine which wake-word engine is selected from among the various different wake-word engines 570, 571. In some embodiments, the pipeline selector 569 can modify other aspects of the signal processing chain, for example the AEC 564 or any aspect of the processing sound data via the VCC 560 and/or downstream components.

The wake-word engine 570 is configured to monitor and analyze received audio to determine if any wake words are present in the audio. The wake-word engine 570 may analyze the received audio using a wake word detection algorithm. If the wake-word engine 570 detects a wake word, a network microphone device may process voice input contained in the received audio. Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wake-words.

In some embodiments, the wake-word engine 570 runs multiple wake word detections algorithms on the received audio simultaneously (or substantially simultaneously). As noted above, different voice services (e.g. AMAZON's Alexa®, APPLE's Siri®, MICROSOFT's Cortana®, GOOGLE'S Assistant, etc.) each use a different wake word for invoking their respective voice service. To support multiple services, the wake word detector 554 may run the received audio through the wake word detection algorithm for each supported voice service in parallel. In such embodiments, the network microphone device 103 may include VAS selector components 574 configured to pass voice input to the appropriate voice assistant service. In other embodiments, the VAS selector components 574 may be omitted. In some embodiments, individual NMDs 103 of the MPS 100 may be configured to run different wake word detection algorithms associated with particular VASes. For example, the NMDs of playback devices 102$a$ and 102$b$ of the Living Room may be associated with AMAZON's ALEXA®, and be configured to run a corresponding wake word detection algorithm (e.g., configured to detect the wake word "Alexa" or other associated wake word), while the NMD of playback device 102$f$ in the Kitchen may be associated with GOOGLE's Assistant, and be configured to run a corresponding wake word detection algorithm (e.g., configured to detect the wake word "OK, Google" or other associated wake word).

In some embodiments, a network microphone device may include speech processing components configured to further facilitate voice processing, such as by performing voice recognition trained to recognize a particular user or a particular set of users associated with a household. Voice recognition software may implement voice-processing algorithms that are tuned to specific voice profile(s).

In operation, the one or more buffers 568—one or more of which may be part of or separate from the memory 213 (FIG. 2A)—capture data corresponding to the detected sound $S_D$. More specifically, the one or more buffers 568 capture detected-sound data that was processed by the upstream AEC 564 and spatial processor 566.

In general, the detected-sound data form a digital representation (i.e., sound-data stream), $S_{DS}$, of the sound detected by the microphones 222. In practice, the sound-data stream $S_{DS}$ may take a variety of forms. As one possibility, the sound-data stream $S_{DS}$ may be composed of frames, each of which may include one or more sound samples. The frames may be streamed (i.e., read out) from the one or more buffers 568 for further processing by downstream components, such as the wake-word engine 570 and the voice extractor 572 of the NMD 503.

In some implementations, at least one buffer 568 captures detected-sound data utilizing a sliding window approach in which a given amount (i.e., a given window) of the most recently captured detected-sound data is retained in the at least one buffer 568 while older detected-sound data are overwritten when they fall outside of the window. For example, at least one buffer 568 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, SNR, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

The VCC 560 also includes a lookback buffer 568$b$ as part of the pipeline selector 569. The lookback buffer 568$b$ may be part of or separate from the memory 213 (FIG. 2A). In operation, the lookback buffer 568$b$ can store sound metadata based on the detected-sound data $S_D$ received from the microphones 222. As noted above, the microphones 224 can include a plurality of microphones arranged in an array. The sound metadata can include, for example: (1) frequency response data for individual microphones of the array, (2) an echo return loss enhancement measure (i.e., a measure of the effectiveness of the acoustic echo canceller (AEC) for each microphone), (3) a voice direction measure; (4) arbitration statistics (e.g., signal and noise estimates for the spatial processing streams associated with different microphones); and/or (5) speech spectral data (i.e., frequency response evaluated on processed audio output after acoustic echo cancellation and spatial processing have been performed). Other sound metadata may also be used to characterize performance of the NMD and/or the individual microphones.

As described in more detail below with respect to FIG. 7, in some embodiments, a remote computing device 106$c$ or the local NMD 503 can perform additional calculations on the sound metadata to identify aberrant microphone behavior or to identify environmental factors deleteriously affecting downstream processing of the sound-data stream $S_{DS}$.

In any case, components of the NMD 503 downstream of the VCC 560 may process the sound-data stream $S_{DS}$. For instance, the wake-word engine 570 can be configured to apply one or more identification algorithms to the sound-data stream $S_{DS}$ (e.g., streamed sound frames) to spot potential wake words in the detected-sound $S_D$. When the wake-word engine 570 spots a potential wake word, the wake-word engine 570 can provide an indication of a "wake-word event" (also referred to as a "wake-word trigger") to the voice extractor 572 in the form of signal $S_W$.

In response to the wake-word event (e.g., in response to a signal $S_W$ from the wake-word engine 570 indicating the wake-word event), the voice extractor 572 is configured to receive and format (e.g., packetize) the sound-data stream $S_{DS}$. For instance, the voice extractor 572 packetizes the frames of the sound-data stream $S_{DS}$ into messages. The voice extractor 572 transmits or streams these messages, $M_V$, that may contain voice input in real time or near real time to a remote VAS, such as the VAS 190 (FIG. 1B), via the network interface 218.

Figure 6A:
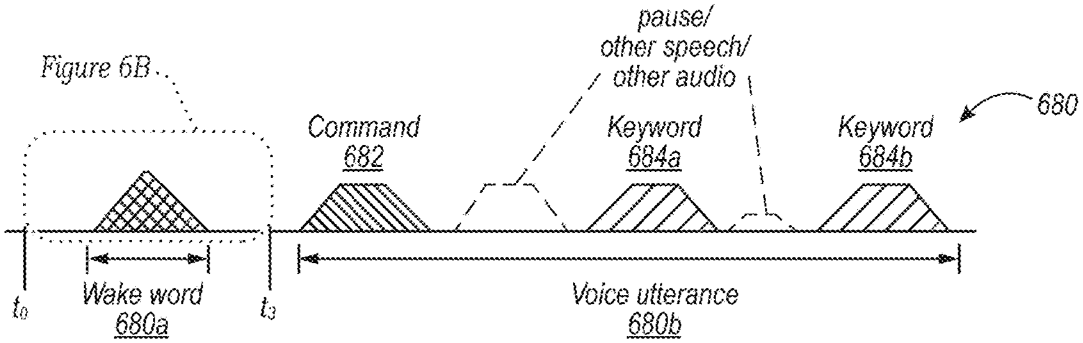
FIG. 6A is a diagram of an example voice input.

The VAS is configured to process the sound-data stream $S_{DS}$ contained in the messages $M_V$ sent from the NMD 503. More specifically, the VAS is configured to identify voice input based on the sound-data stream $S_{DS}$. Referring to FIG. 6A, a voice input 680 may include a wake-word portion 680$a$ and an utterance portion 680$b$. The wake-word portion 680$a$ corresponds to detected sound that caused the wake-word event. For instance, the wake-word portion 680$a$ corresponds to detected sound that caused the wake-word engine 570 to provide an indication of a wake-word event to the voice extractor 572. The utterance portion 680$b$ corresponds to detected sound that potentially comprises a user request following the wake-word portion 680$a$.

Figure 6B:
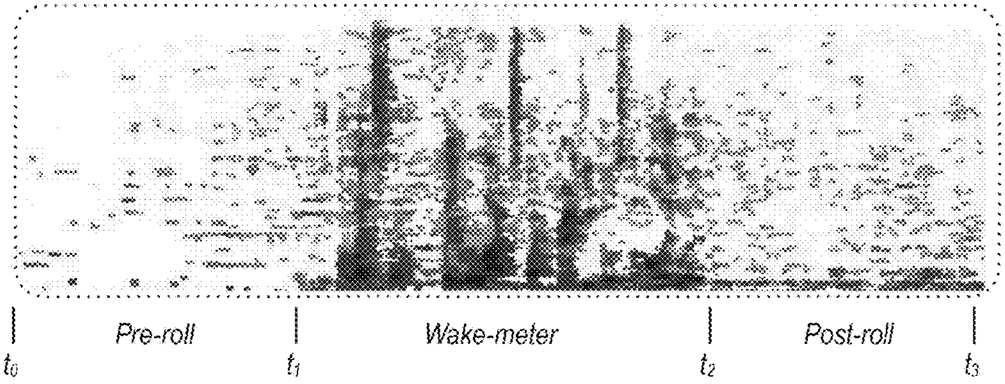
FIG. 6B is a graph depicting an example sound specimen in accordance with aspects of the disclosure.

As an illustrative example, FIG. 6B shows an example first sound specimen. In this example, the sound specimen corresponds to the sound-data stream $S_{DS}$ (e.g., one or more audio frames) associated with the spotted wake word 680$a$ of FIG. 6A. As illustrated, the example first sound specimen comprises sound detected in the playback device 102$i$'s environment (i) immediately before a wake word was spoken, which may be referred to as a pre-roll portion (between times $t_0$ and $t_1$), (ii) while the wake word was spoken, which may be referred to as a wake-meter portion (between times $t_1$ and $t_2$), and/or (iii) after the wake word was spoken, which may be referred to as a post-roll portion (between times $t_2$ and $t_3$). Other sound specimens are also possible.

Typically, the VAS may first process the wake-word portion 680$a$ within the sound-data stream $S_{DS}$ to verify the presence of the wake word. In some instances, the VAS may determine that the wake-word portion 680*a* comprises a false wake word (e.g., the word "Election" when the word "Alexa" is the target wake word). In such an occurrence, the VAS may send a response to the NMD 503 (FIG. 5) with an indication for the NMD 503 to cease extraction of sound data, which may cause the voice extractor 572 to cease further streaming of the detected-sound data to the VAS. The wake-word engine 570 may resume or continue monitoring sound specimens until another potential wake word, leading to another wake-word event. In some implementations, the VAS may not process or receive the wake-word portion 680*a* but instead processes only the utterance portion 680*b*.

In any case, the VAS processes the utterance portion 680*b* to identify the presence of any words in the detected-sound data and to determine an underlying intent from these words. The words may correspond to a certain command and certain keywords 684 (identified individually in FIG. 6A as a first keyword 684*a* and a second keyword 684*b*). A keyword may be, for example, a word in the voice input 680 identifying a particular device or group in the MPS 100. For instance, in the illustrated example, the keywords 684 may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion 680*b* may include additional information, such as detected pauses (e.g., periods of non-speech) between words spoken by a user, as shown in FIG. 6A. The pauses may demarcate the locations of separate commands, keywords, or other information spoke by the user within the utterance portion 680*b*.

Based on certain command criteria, the VAS may take actions as a result of identifying one or more commands in the voice input, such as the command 682. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these devices (e.g., raise/lower volume, group/ungroup devices, etc.), turn on/off certain smart devices, among other actions. After receiving the response from the VAS, the wake-word engine 570 the NMD 503 may resume or continue to monitor the sound-data stream $S_{DS}$ until it spots another potential wake-word, as discussed above.

Referring back to FIG. 5, in multi-VAS implementations, the NMD 503 includes a VAS selector 574 that is generally configured to direct the voice extractor's extraction and transmission of the sound-data stream $S_{DS}$ to the appropriate VAS when a given wake-word is identified by a particular wake-word engine, such as the wake-word engine 570 or one of the additional wake-word engines 571. In such implementations, the NMD 503 may include multiple, different wake-word engines and/or voice extractors, each supported by a particular VAS. Similar to the discussion above, each wake-word engine may be configured to receive as input the sound-data stream $S_{DS}$ from the one or more buffers 568 and apply identification algorithms to cause a wake-word trigger for the appropriate VAS. As noted above, the pipeline selector 569 may modify operation of the NMD 503 based on the VAS selected. In some embodiments, the pipeline selector 569 may receive input from the VAS selector 574 indicating which VAS is selected. Based on the input from the VAS selector 574, the pipeline selector 569 may modify operation of the NMD 503, for example by causing the spatial processor 566 to assume a particular configuration, by selecting a particular wake-word engine, and/or by modifying any other performance parameter of the NMD 503.

In additional or alternative implementations, one or more of the additional voice-input identification engines 571 enable the NMD 503 to operate without the assistance of a remote VAS. As an example, such an engine may identify in detected sound certain commands (e.g., "play," "pause," "turn on," etc.) and/or certain keywords or phrases, such as the unique name assigned to a given playback device (e.g., "Bookcase," "Patio," "Office," etc.). In response to identifying one or more of these commands, keywords, and/or phrases, the NMD 503 may communicate a signal (not shown in FIG. 5) that causes the audio processing components 216 (FIG. 2A) to perform one or more actions. For instance, when a user says "Hey Sonos, stop the music in the office," the NMD 503 may communicate a signal to the office playback device 102*n*, either directly, or indirectly via one or more other devices of the MPS 100, which causes the office device 102*n* to stop audio playback. Reducing or eliminating the need for assistance from a remote VAS may reduce latency that might otherwise occur when processing voice input remotely. In some cases, the identification algorithms employed may be configured to identify commands that are spoken without a preceding wake word. For instance, in the example above, the NMD 503 may employ an identification algorithm that triggers an event to stop the music in the office without the user first saying "Hey Sonos" or another wake word.

III. Example Systems and Methods for Modifying NMD Operation

As noted above a network device such as an NMD 503 can have a variety of tunable parameters that affect identification and processing of voice input in detected sounds captured by one or more microphones of the NMD. For example, a particular microphone may be identified as defective or aberrant and that microphone may be ignored or filtered out of downstream processing. As another example, the gain applied to the sound data during processing can be adjusted up or down to improve voice detection. For example, a device used by unusually loud speakers may experience improved NMD performance if the fixed gain is adjusted downward, while conversely a device used by unusually soft speakers may experience improved NMD performance if the fixed gain is adjusted upward. Another tunable parameter is noise-reduction, for example modifying the extent to which the NMD processes the sound data or sound-data stream to reduce noise and/or improve the signal-to-noise ratio. The NMD may also modify an acoustic echo cancellation (AEC) parameter (e.g., by modifying operation of the AEC 564 in FIG. 5), a spatial processing algorithm of the NMD, a localization algorithm of the NMD (i.e., an algorithm for detecting a voice direction), or other parameters of the VCC 560 or other NMD components.

Another tunable parameter is a wake-word-detection sensitivity parameter. For example, the wake-word engine 570 (or any of the additional wake-word engines 571) may have one or more parameters that adjust a sensitivity or threshold for identifying a wake word in the audio input. This parameter can be adjusted to improve NMD performance. Lowering the threshold (or increasing the sensitivity) may increase the rate of false-positives while reducing the rate of false-negatives, while conversely increasing the threshold (or decreasing the sensitivity) may decrease the rate of false-positives while increasing the rate of false-negatives. Adjusting the wake-word-detection sensitivity parameter can allow an NMD to achieve a suitable tradeoff between the false-negative and false-positive rates.

In addition or alternatively to those parameters listed above, in some embodiments the NMD can modify the spatial processing algorithm to improve performance in detecting and processing voice input (e.g., by modifying operation of the spatial processor 566 in FIG. 5). In various embodiments, the spatial processing algorithm can comprise one or more multi-channel Wiener filters, other filters, and/or one or more beam-forming algorithms. As one possibility, the spatial processor 566 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 566 may be configured to determine a speech presence probability. The threshold or coefficients associated with these metrics (e.g., energy within certain bands, entropy, etc.) can be adjusted to improve performance of the NMD in detecting and processing voice input. For example, one or more parameters of a multi-channel Wiener filter spatial processing algorithm can be adjusted to improve NMD performance. Such parameters can include the minimum gain, reflecting a spectral floor of the noise reduction portion of the multi-channel Wiener filter. Other parameters of the multi-channel Wiener filter can be modified to improve NMD performance.

In various embodiments, the NMD performance parameters can be adjusted on an individual device level, on a home or environment level (e.g., all the NMDs within a customer's home can be adjusted together), or on a population level (e.g., all the NMDs in a given region can be adjusted together). As described in more detail below, one or more NMD performance parameters can be modified based on sound metadata. In some embodiments, one or more NMD performance parameters are adjusted based on the particular VAS selected for communication with the NMD, as described in more detail below.

a. Example Systems and Methods for Modifying NMD Operation Based on Sound Metadata As noted above, a network device such as NMD 503 can include a variety of tunable parameters that affect performance in detecting and processing audio input. In some embodiments, one or more of these parameters can be modified based on sound metadata. For example, the NMD can modify one or more performance parameters to compensate for an identified microphone defect or environmental factor reducing performance of the NMD. Sound metadata can be derived from the sound data $S_D$ obtained via the individual microphones of the NMD and/or from the sound-data stream $S_{DS}$ provided by the VCC 560 (FIG. 5). Example of sound metadata include: (1) frequency response data for individual microphones of the NMD, (2) an echo return loss enhancement measure (i.e., a measure of the effectiveness of the acoustic echo canceller (AEC) for each microphone), (3) a voice direction measure; (4) arbitration statistics (e.g., signal and noise estimates for the spatial processing streams associated with different microphones); and/or (5) speech spectral data (i.e., frequency response evaluated on processed audio output after acoustic echo cancellation and spatial processing have been performed). Other sound metadata may also be used to characterize performance of the NMD and/or the individual microphones.

Figure 7:
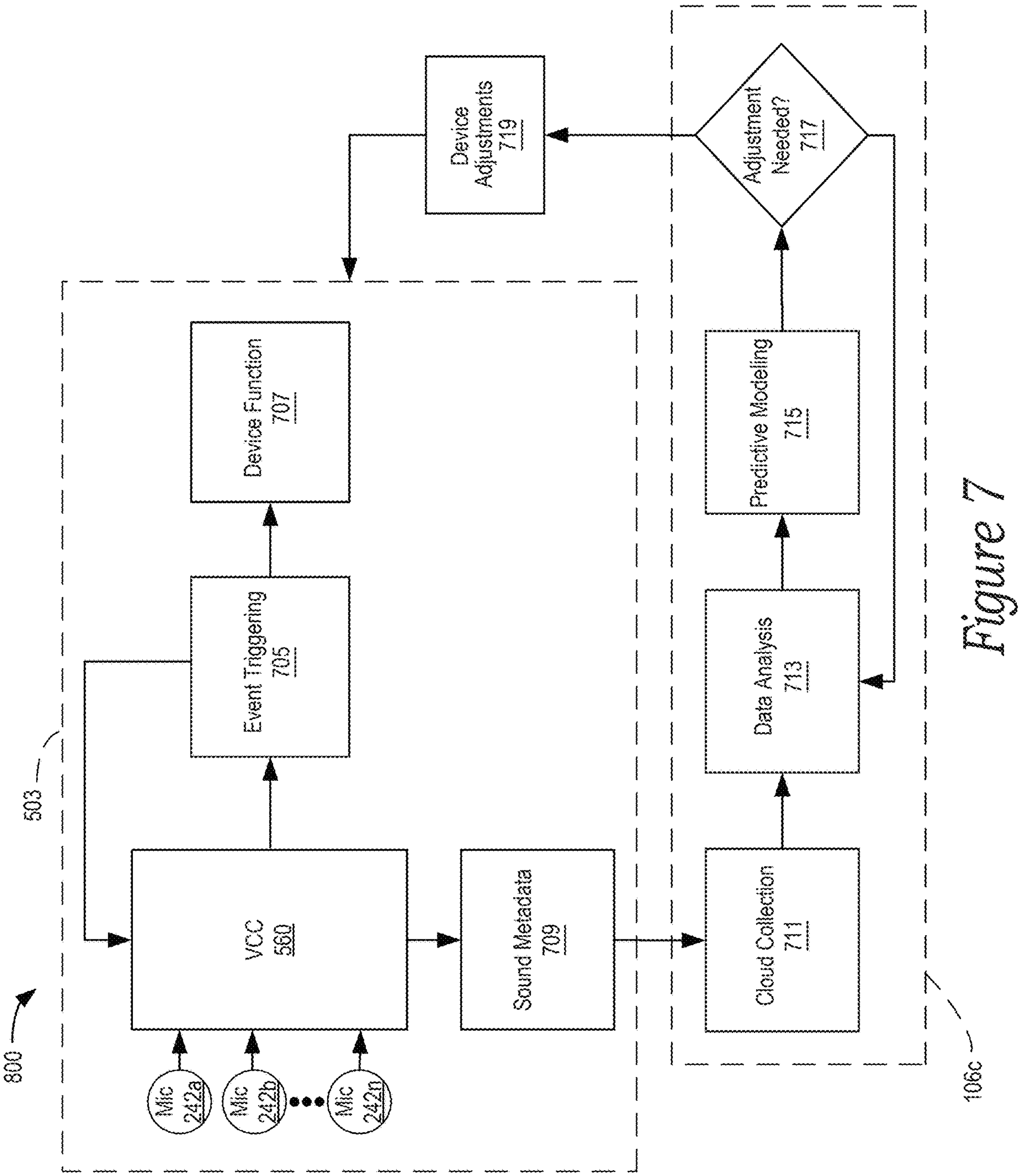
FIG. 7 is a functional flow diagram of an example microphone evaluation and adaptation in accordance with aspects of the disclosure.

FIG. 7 is a functional flow diagram 700 of an example microphone evaluation and adaptation. The diagram 700 illustrates functions that occur on an NMD 503 as well as functions that can occur remotely, for example, on remote computing device(s) 106*c*, which can perform remote evaluation and processing of sound metadata as described in more detail below. In one example, the remote computing devices 106*c* provide cloud servers for one or more SONOS Wireless HiFi Systems. In at least some embodiments, any or all of the functions depicted in flow diagram 700 can be performed on the NMD 503 rather than the local computing device 106*c*.

Beginning with the NMD 503, an array of individual microphones 242*a*-242*n* detect sound and provide sound data to the voice-capture components (VCC) 560 over multiple channels (e.g., with each microphone having a corresponding channel). As described above with respect to FIG. 5, the VCC 560 can include one or more buffers 568*a* in addition to a pipeline selector 569 having a lookback buffer 568*b*. The VCC 560 also includes an AEC 564 and a spatial processor 566. In various embodiments, the number of microphones 242*a*-242*n* in the array can vary, for example, 2, 3, 4, 5, 6, 7, 8, 9, 10, or more microphones in the array. The microphones 242*a*-242*n* can be arranged to detect sound in the environment of the NMD 503. In one example, the microphone(s) 242*a*-242*n* may be arranged to detect audio from one or more directions relative to the NMD 503. The microphone(s) 242*a*-242*n* may further be arranged to capture location information of an audio source (e.g., voice, audible sound) and/or to assist in filtering background noise.

The VCC 560 can store the sound data from the individual microphones 242*a*-242*n* in one or more buffers for a predetermined time interval. For example, in some embodiments the VCC 560 stores the sound data for less than less than 5 seconds, less than 4 seconds, less than 3 seconds, less than 2 seconds, or less than 1 second, such as overwriting in a buffer. In some implementations, the VCC 560 includes a buffer (e.g., buffer 568*a*) that captures sound data utilizing a sliding window approach in which a given amount (i.e., a given window) of the most recently captured detected-sound data is retained in the at least one buffer 568*a* while older sound data are overwritten when they fall outside of the window. For example, at least one buffer 568*a* may temporarily retain 20 frames of a sound specimen at given time, discard the oldest frame after an expiration time, and then capture a new frame, which is added to the 19 prior frames of the sound specimen.

The VCC 560 can output a sound-data stream to block 705 for event triggering. Here, the NMD 503 can evaluate the sound-data stream to detect a predetermined trigger event. For example, the trigger event detected in block 705 can be detection of a wake word in the sound-data stream (e.g., using a wake-word engine 570 shown in FIG. 5). In some embodiments, the trigger event can take other forms. For example, the trigger event can be the detection of audio signals having some specified property (e.g., detected audio levels above a predetermined threshold, detected audio signals for a predetermined length of time, etc.). If no trigger event is detected in block 705, then the detected-sound data in the VCC 560 can be deleted, discarded, or overwritten and the microphones 242*a*-242*n* can continue to pass newly acquired sound data to the VCC 560 until a trigger event is detected in block 705.

If the trigger event is detected in block 705, then the sound-data stream is passed to device function in block 707. For example, in block 707, one of multiple VASes can be selected, the processed audio can be transmitted to a VAS for further processing, audible output can be provided to a user, instructions can be transmitted to an associated playback device, or any other suitable operation can be carried out following the detection of the trigger event in block 705.

Once the trigger event is detected in block 705, an indication is provided to the VCC 560, which can in turn provide sound metadata in block 709 to a remote computing device 106*c*. The sound metadata 709 can be based on the sound data from the microphones 242*a*-242*n*. To protect user privacy, it can be useful to rely only on sound metadata that does not reveal the original audio content (e.g., the content of recorded speech input or other detected sound data). The NMD can derive the sound metadata from the detected sound data a manner that renders the original sound data indecipherable if one only has access to the sound metadata. As noted above, examples of sound metadata include: (1) frequency response data for individual microphones of the NMD, (2) an echo return loss enhancement measure (i.e., a measure of the effectiveness of the acoustic echo canceller (AEC) for each microphone), (3) a voice direction measure; (4) arbitration statistics (e.g., signal and noise estimates for the spatial processing streams associated with different microphones); and/or (5) speech spectral data (i.e., frequency response evaluated on processed audio output after acoustic echo cancellation and spatial processing have been performed). Other sound metadata may also be used to characterize performance of the NMD and/or the individual microphones.

From block 709, the sound metadata can be transmitted from the NMD 503 to the remote computing device 106*c* for cloud collection in block 711. For example, the remote computing device 106*c* can collect microphone performance data from one or more NMDs. In some embodiments, the remote computing device 106*c* can collect sound metadata from a large population of NMDs, and such population metadata can be used to derive averages, identify outliers, and guide modification of NMD performance parameters to improve operation of the NMD 503. Because the sound metadata is derived from the sound data but does not reveal the sound data, sending only the sound metadata to the remote computing device 106*c* allows for the evaluation of NMD performance without exposing the actual audio content from which the sound data is derived.

In block 713 the remote computing device 106*c* analyzes the sound metadata. In some embodiments, analyzing the sound metadata includes comparing one or more features of the sound metadata with reference values or sample population values. For example, any feature of the sound metadata (such as signal levels, frequency response data, etc.) can be compared with predetermined reference values or averaged values collected from a sample population. In some embodiments, the analysis of the sound metadata can be performed locally by the NMD 503 rather than or in addition to the evaluation performed by the remote computing device 106*c*.

Figure 8:
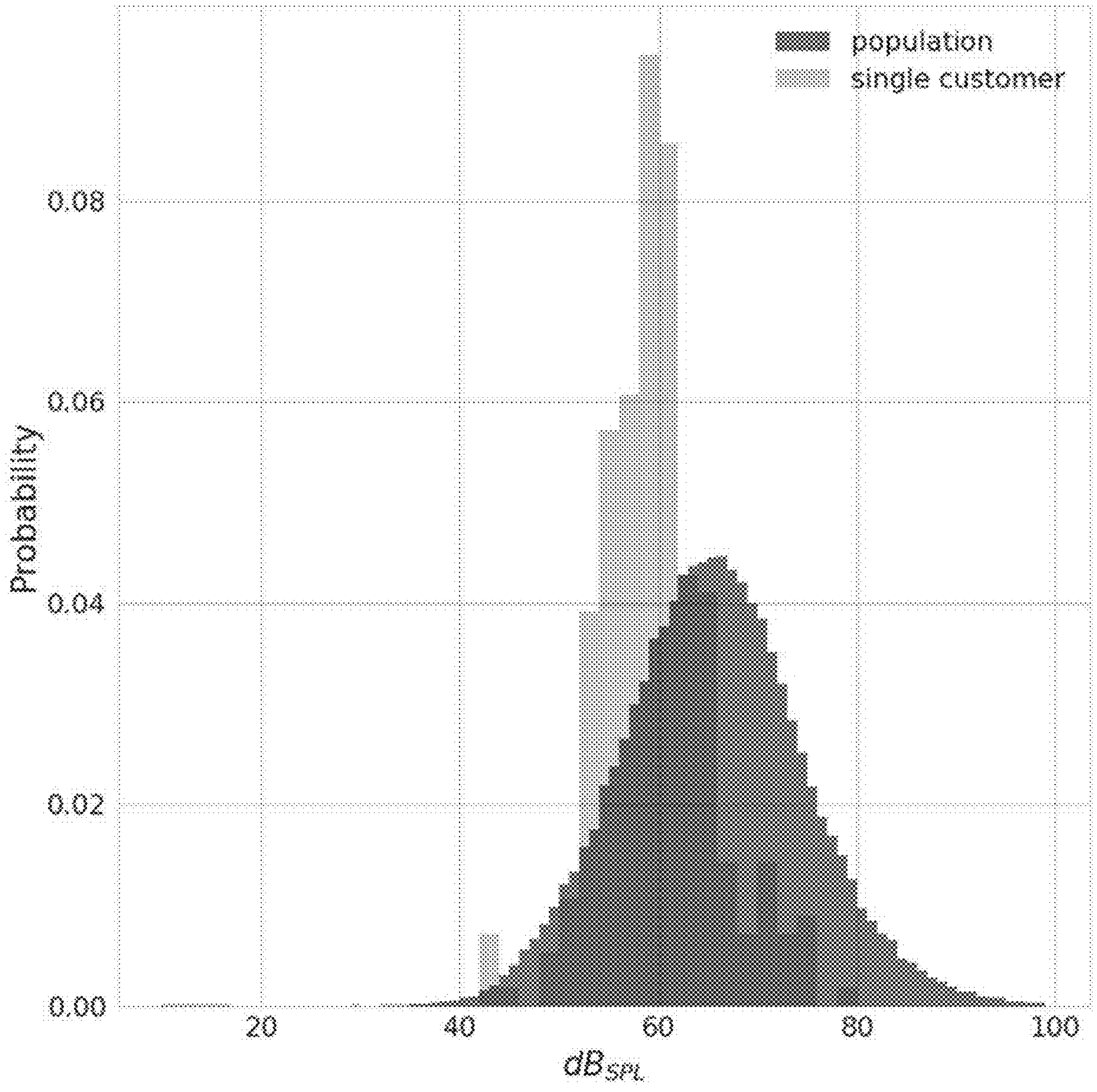
FIG. 8 illustrate example sound amplitude values obtained from a single network microphone device and from a sample population of network microphone devices.

FIG. 8 illustrates an example graph of distributions of sound amplitude values (in decibels) for a single customer device and a population. As illustrated, the population graph assumes a generally Gaussian or bell-shaped distribution centered at approximately 65 $dB_{SPL}$. In contrast, the single customer's distribution peaks sharply at just under 60 $dB_{SPL}$, with a narrower distribution range. This indicates that a greater proportion of the detected sound by the customer's device has a lower amplitude than that of the averaged population. In this instance, it may be advantageous to increase a fixed gain value applied to sound data for the customer's device. In addition or alternatively, it may be advantageous to modify the spatial processing algorithms, the wake-word-detection sensitivity parameters, or some other operational aspects of the NMD in order to improve performance of the single customer's NMD as compared with the larger population.

FIG. 8 illustrates just one example comparison between an individual NMD's performance as indicated by sound metadata and population averages. In various embodiments, any feature or characteristic of the sound metadata can be compared and evaluated between a single NMD and any number of other NMDs. The reference sample can be all other NMDs for which data has been obtained, some subset of select NMDs, or a single reference value or range of reference values for particular sound metadata features. In some embodiments, the reference sample can include other NMDs that are located in a similar geographic region. For example, voice accents may affect the identification and processing of voice input. As a result, it may be useful to modify performance parameters of the NMD by geographic region, such that an NMD in Australia may have different performance parameters than an NMD in Spain.

Referring back to FIG. 7, in block 715, the computing device 106*c* can perform predictive modeling to identify potential device adjustments that would improve detection and processing of voice input. For example, a virtual test framework can be used to run a large number of simulations using a Monte Carlo approach, representing the expected performance of NMDs by users in the real world. A series of audio inputs having different characteristics can be processed by simulated NMDs having a range of different performance parameter values. The best-performing parameter values can then be identified based on the simulated results. In some embodiments, the best-performing parameters are determined at least in part by the rate of false-positives and false-negatives in wake-word detection. These identified performance parameters may then be used to modify performance of NMDs in the real world. This can include updating performance parameters only for NMDs that experience certain types of audio input (e.g., NMDs having unusually high background noise values, or having low-amplitude detected sound values, etc.).

In block 717, the remote computing device 106*c* determines whether the NMD performance needs to be modified based on the data analysis in block 713 and/or the predictive modeling in block 715. If no modification is needed, then the process returns to data analysis in block 713 for analysis of newly received sound metadata. If, in decision block 717, a modification is needed, then the process continues to block 719 to adjust the operation of the NMD.

With continued reference to block 719, modification of the NMD can take a number of forms depending on the identified features of the metadata. For example, adjustment of the device can include disregarding input from a defective microphone, adjusting a fixed gain, modifying a noise-reduction parameter, a wake-word-detection sensitivity parameter, or adjusting a spatial processing algorithm, etc.

Figure 9:
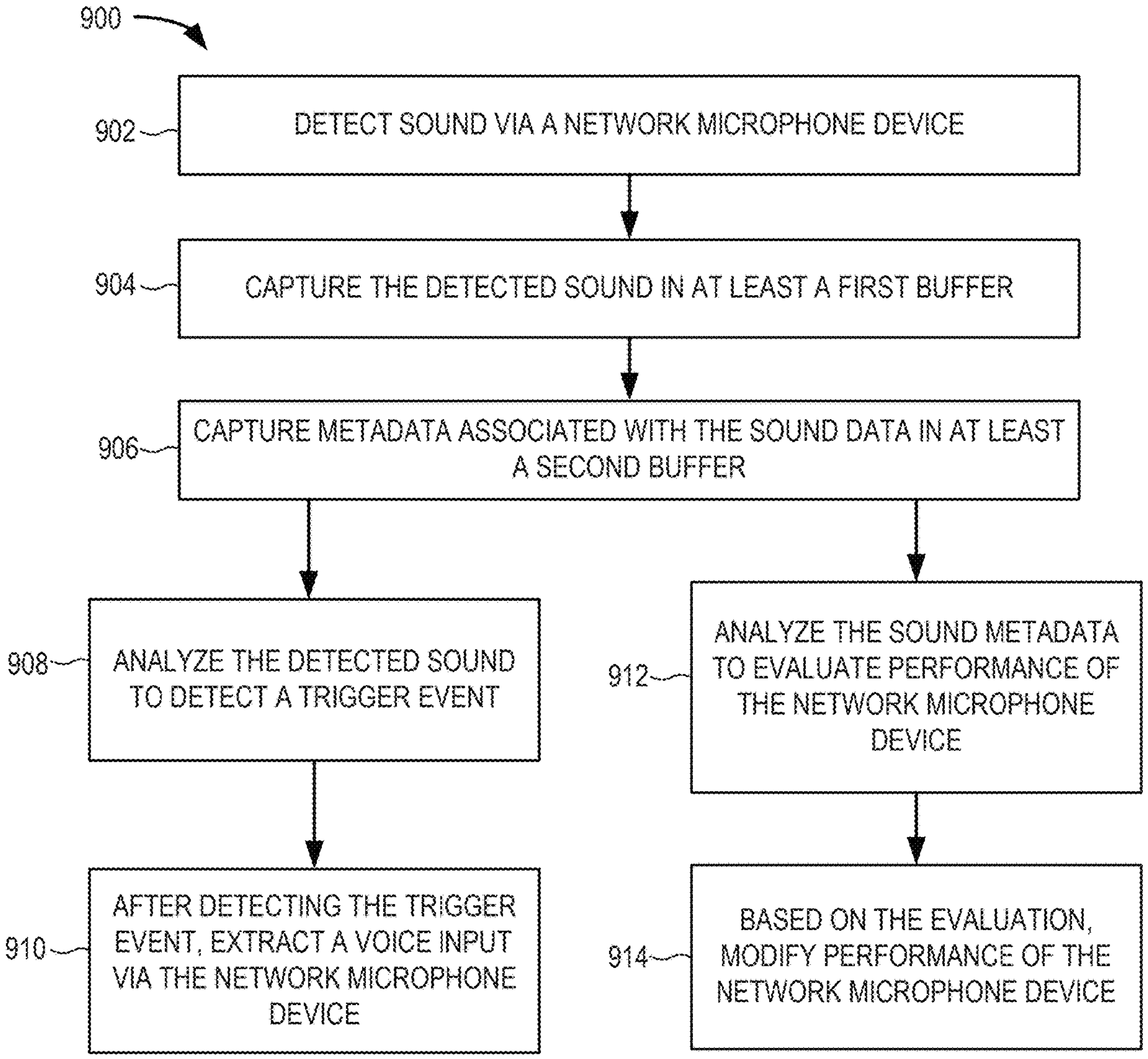
FIG. 9 illustrates an example method for modifying performance of a network microphone device in accordance with aspects of the disclosure.

FIG. 9 is an example method 900 for modifying performance of a network microphone device. The method 900 begins at block 902 with the NMD detecting sound via individual microphones of the NMD. Next, method 900 advances to block 904, with the NMD capturing the detected sound in at least a first buffer. For example, the captured sound can be stored as sound data $S_D$ in buffer(s) 568*a* (FIG. 5).

In block 906, the NMD captures metadata associated with the sound data in at least a second buffer. For example, the sound metadata can be stored in the lookback buffer 560 (FIG. 5) or in other memory associated with the NMD. As noted above, to preserve user privacy, it can be useful to rely only on sound metadata that does not reveal the original audio content (e.g., the content of recorded speech input or other detected sound data). Examples of such sound metadata include: (1) frequency response data, (2) echo return loss enhancement measures, (3) voice direction measures; (4) arbitration statistics; and/or (5) speech spectral data. Other sound metadata may also be captured and stored in the second buffer.

Next, the method 900 continues in block 908 with analyzing the detected sound to detect a trigger event. In some embodiments, the trigger event is the detection of a wake word. The wake word can be detected, for example, via the wake-word engine 570 (FIG. 5) as described above. In some embodiments, the trigger event can take other forms. For example, the trigger event can be the detection of audio signals having some specified property (e.g., detected audio volume above a predetermined threshold, detected audio signals for a predetermined length of time, etc.).

After detecting the trigger event, the method 900 continues in block 910 with extracting a voice input via the NMD. For example, a voice extractor 572 (FIG. 5) can receive and format (e.g., packetize) the stream of sound-data into messages that may be transmitted in real time or near real time to a remote VAS via a network interface.

In block 912, the method 900 involves analyzing the sound metadata to evaluate performance of the NMD. This analysis can be performed either locally by the NMD or remotely by one or more remote computing devices 106*c* (FIG. 7). In some embodiments, the analysis in block 912 can be performed concurrently with the trigger-event detection in block 908. In other embodiments, the analysis in block 912 only occurs after a trigger event has been detected in block 908.

Referring to block 912, analyzing the sound metadata can include comparing one or more features of the sound metadata with reference values or a sample population. For example, any features of the sound metadata such as signal levels, frequency response data, etc. can be compared with reference values or values collected and averaged over a sample population. In some embodiments, the analysis of the sound metadata can be performed locally by the NMD 503 rather than or in addition to the evaluation performed by the remote computing device 106*c*.

The method 900 continues in block 914 with modifying performance of the NMD based on the evaluation in block 912. Modification of the NMD can take a number of forms depending on the identified features of the metadata. For example, adjustment of the device can include disregarding input from a defective microphone, adjusting a fixed gain, modifying a noise-reduction parameter, a wake-word-detection sensitivity parameter, or adjusting a spatial processing algorithm, etc.

b. Example Systems and Methods for Modifying NMD Operation Based on Selected VAS As noted above, one or more performance parameters of a network device such as NMD 503 can be modified based at least in part on the particular VAS selected for communication with the NMD 503. Because different VASes may process the received audio input differently, operation of the NMD 503 may be modified to improve or optimize voice detection for the particular VAS. For example, different VASes may utilize sound data from different numbers of microphones, and/or may use different techniques for wake-word detection and other voice processing. In one embodiment, a first VAS may use sound data from six microphones and rely on a beamforming algorithm for noise reduction and improved voice processing, while a second VAS may use sound data from only two microphones and employ a different algorithm for voice detection and processing. In such cases, it can be useful to modify one or more operating parameters of the NMD based on which of these two VASes is selected.

As shown in FIG. 5, the VCC 560 of the NMD 503 includes both a pipeline selector 569 and a spatial processor 566. The pipeline selector 569 can cause the spatial processor 566 to assume different configurations depending on the selected VAS. For example, in a first configuration, the spatial processor utilizes a beamforming algorithm, while in a second configuration, the spatial processor utilizes a linear time-invariant filter such as a multi-channel wiener filter. The pipeline selector 569 may cause the spatial processor 566 to assume the first configuration for a first selected VAS, while the spatial processor 566 changes to the second configuration when a second VAS is selected over the first VAS. In some embodiments, the pipeline selector 569 may also change other operating parameters of the NMD 503 instead of or in addition to changing the spatial processing algorithm. For example, the pipeline selector 569 may adjust a fixed gain of one or more of the microphones, adjust a wake-word sensitivity parameter, adjust noise-reduction parameters, or make other modifications to the operation of the NMD.

Figure 10:
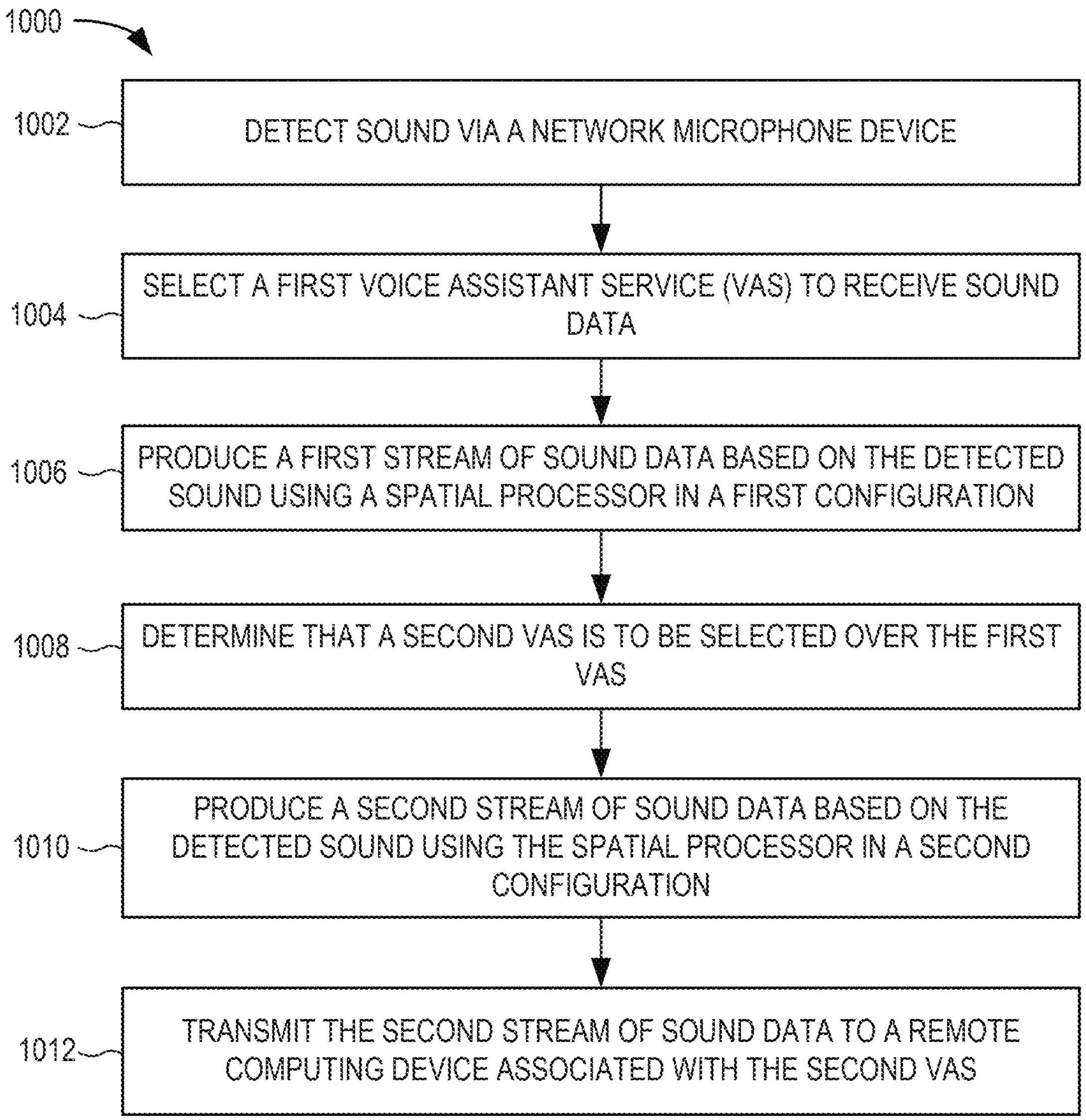
FIG. 10 illustrates an example method of modifying performance of a network microphone device based on VAS selection in accordance with aspects of the disclosure.

FIG. 10 is an example method 1000 for modifying performance of an NMD based at least in part on the VAS associated with the NMD. In block 1002, the method involves detecting sound via a network microphone device as described above. Next, the method continues in block 1004 with selecting a first VAS to receive the sound data obtained via the NMD. The first VAS may be selected by manual user configuration (e.g., a user selecting a particular VAS during setup), or the first VAS may be selected based on detection a particular wake-word, for example as detected via the wake-word engine 570 (FIG. 5). In one example, if a user speaks the wake-word "Alexa," then the selected VAS may be the AMAZON VAS, which may then receive sound data obtained via the NMD.

In block 1006, the method involves producing a first stream of sound data based on the detected sound using a spatial processor in a first configuration. As described above with respect to FIG. 5, producing the sound-data stream can include processing the sound data using the AEC 564, the spatial processor 566, and/or any additional processing steps. In some embodiments, the first sound-data stream can be transmitted to the first VAS for processing.

In block 1008, the method determines that a second VAS is to be selected over the first VAS. For example, a user may elect to associate the NMD with the second VAS in place of the first VAS. Alternatively or in addition, a user may utter a wake word that is associated with the second VAS, and in response the NMD can select the second VAS in place of the first VAS. For example, if an NMD is associated with the AMAZON VAS (either due to user selection or due to detection of an associated wake word), a user may say "OK Google" to select the GOOGLE VAS in place of the AMAZON VAS.

In block 1010, the method involves producing a second stream of sound data based on the detected sound using the spatial processor in a second configuration different from the first configuration. The second configuration of the spatial processor can differ from the first configuration in any number of ways. For example, the second configuration may vary from the first configuration in the number of channels of sound data or number of microphones utilized, in the algorithms used to process the sound data, in the coefficients utilized for a particular algorithm, or in any other aspect. In one example, either the first or the second configuration of the spatial processor can utilize a beamforming algorithm, while in the other configuration, the spatial processor utilizes a linear filter algorithm. In some embodiments, the different configurations of the spatial processor utilize similar algorithms or filters but with differing coefficients. In some embodiments, the spatial processor can assume three, four, five, or more different configurations, each associated with a different VAS. Once that VAS is selected, the spatial processor can assume the corresponding configuration for producing a stream of sound data to be transmitted to the selected VAS.

In some embodiments, at least some aspects of the spatial processor are modified based on the selected VAS, while at least some other aspects of the spatial processor are modified based on other factors, such as sound metadata as described above with respect to FIGS. 7-9. For example, the number of channels utilized in the spatial processing algorithm may be selected depending on the associated VAS, while particular coefficients of the spatial processing algorithm may be selected at least in part based on the sound metadata or other factors.

Returning to FIG. 10, the method continues in block 1012 with transmitting the second stream of sound data to a remote computing device associated with the second VAS. For example, the NMD may transmit, via a network interface to one or more servers of the second VAS, data representing the sound-data stream and a command or query to process the sound-data stream. The command or query may cause the second VAS to process the voice command and may vary according to the particular VAS so as to conform the command or query to the selected VAS (e.g., to an API of the VAS).

As noted above, in some examples, the captured sound-data stream includes voice input 680, which in turn includes a first portion representing the wake word 680*a* and a second portion representing a voice utterance 680*b*, which can include one or more commands such as command 682. In some cases, the NMD may transmit only the portion of the sound-data stream representing at least the second portion of the voice input (e.g., the portion representing the voice utterance 680*b*). By excluding the first portion, the NMD may reduce bandwidth needed to transmit the voice input 680 and avoid possible misprocessing of the voice input 680 due to the wake word 680*a*, among other possible benefits. Alternatively, the NMD may transmit portions of the second sound-data stream representing both portions of the voice input 680, or some other portion of the voice input 680.

After the NMD transmits the second sound-data stream to the second VAS, and after the second VAS processes the second sound-data stream, the NMD can receive results of the processing. For instance, if the second sound-data stream represents a search query, the NMD may receive search results. As another example, if the second sound-data stream represents a command to a device (e.g., a media playback command to a playback device), the NMD may receive the command and perhaps additional data associated with the command (e.g., a source of media associated with the command). The NMD may output these results as appropriate based on the type of command and the received results. Alternatively, if the second sound-data stream includes a voice command directed to another device other than the NMD, the results might be directed to that device rather than to the NMD.

In at least some embodiments, the second VAS is able to more effectively or efficiently process the second sound-data stream at least in part because the spatial processor produced the second sound-data stream while in the second configuration rather than in the first configuration. For example, the second configuration of the spatial processor can be particularly suited to provide the second sound-data stream in such a manner as to facilitate, improve, or optimize performance of the second VAS in processing the second sound-data stream.

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

In addition to the examples described herein with respect to grouping and bonding playback devices, in some implementations multiple playback devices may be merged together. For example, a first playback device may be merged with a second playback device to form a single merged "device." The merged playback devices and may not be specifically assigned different playback responsibilities. That is, the merged playback devices and may, aside from playing audio content in synchrony, each play audio content as they would if they were not merged. However, the merged devices may present to the media playback system and/or to the user as a single user interface (UI) entity for control.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A playback device comprising:

a housing;

a microphone array including a plurality of microphones disposed within the housing; one or more processors disposed within the housing; and tangible, non-transitory computer-readable media having stored therein instructions executable by the one or more processors to cause the playback device to perform a method comprising:

capturing sound via a first set of microphones selected from the plurality of microphones;

capturing the sound via a second set of microphones selected from the plurality of microphones, wherein the second set of microphones is different from the first set of microphones;

producing a first sound-data stream based on the sound captured via the first set of microphones;

producing a second sound-data stream based on the sound captured via the second set of microphones;

analyzing the first sound-data stream using a first wake-word engine, wherein the first wake-word engine is configured to detect a first wake word associated with a first voice assistant service (VAS); and analyzing the second sound-data stream using a second wake-word engine, wherein the second wake-word engine is configured to detect a second wake word associated with a second VAS, wherein the first wake-word engine is different from the second wake-word engine, and wherein the first wake word is different from the second wake word.

2. The playback device of claim 1, wherein the sound is captured via the first set of microphones and the second set of microphones concurrently.

3. The playback device of claim 1, wherein the sound is captured via the second set of microphones at a different time than when the sound is captured via the first set of microphones.

4. The playback device of claim 1, wherein the first sound-data stream is produced using voice processing components in a first configuration, and wherein the second sound-data stream is produced using voice processing components in a second configuration.

5. The playback device of claim 1, wherein the method further comprises:

transmitting, via a network interface of the playback device, at least a voice utterance to one or more remote servers following detection of the first wake word or the second wake word.

6. The playback device of claim 1, wherein at least one microphone is included in both the first set of microphones and the second set of microphones.

7. The playback device of claim 1, wherein the first set of microphones is the plurality of microphones.

8. A method comprising:

capturing sound via a first set of microphones selected from a plurality of microphones of a microphone array of a playback device;

capturing the sound via a second set of microphones selected from the plurality of microphones, wherein the second set of microphones is different from the first set of microphones;

producing a first sound-data stream based on the sound captured via the first set of microphones;

producing a second sound-data stream based on the sound captured via the second set of microphones;

analyzing the first sound-data stream using a first wake-word engine, wherein the first wake-word engine is configured to detect a first wake word associated with a first voice assistant service (VAS); and analyzing the second sound-data stream using a second wake-word engine, wherein the second wake-word engine is configured to detect a second wake word associated with a second VAS, wherein the first wake-word engine is different from the second wake-word engine, and wherein the first wake word is different from the second wake word.

9. The method of claim 8, wherein the sound is captured via the first set of microphones and the second set of microphones concurrently.

10. The method of claim 8, wherein the sound is captured via the second set of microphones at a different time than when the sound is captured via the first set of microphones.

11. The method of claim 8, wherein the first sound-data stream is produced using voice processing components in a first configuration, and wherein the second sound-data stream is produced using voice processing components in a second configuration.

12. The method of claim 11, wherein producing the first sound-data stream comprises spatially processing the sound captured via the first set of microphones via a first spatial processor configuration, and wherein producing the second sound-data stream comprises spatially processing the sound captured via the second set of microphones via a second spatial processor configuration.

13. The method of claim 8, further comprising:

transmitting, via a network interface of the playback device, at least a voice utterance to one or more remote servers following detection of the first wake word or the second wake word.

14. The method of claim 8, wherein at least one microphone is included in both the first set of microphones and the second set of microphones.

15. The method of claim 8, wherein the first set of microphones is the plurality of microphones.

16. A tangible, non-transitory, computer-readable medium having stored therein instructions executable by one or more processors to cause a playback device having a microphone array including a plurality of microphones disposed within a housing of the playback device to perform a method comprising:

capturing sound via a first set of microphones selected from the plurality of microphones;

capturing the sound via a second set of microphones selected from the plurality of microphones, wherein the second set of microphones is different from the first set of microphones;

producing a first sound-data stream based on the sound captured via the first set of microphones;

producing a second sound-data stream based on the sound captured via the second set of microphones;

analyzing the first sound-data stream using a first wake-word engine, wherein the first wake-word engine is configured to detect a first wake word associated with a first voice assistant service (VAS); and analyzing the second sound-data stream using a second wake-word engine, wherein the second wake-word engine is configured to detect a second wake word associated with a second VAS, wherein the first wake-word engine is different from the second wake-word engine, and wherein the first wake word is different from the second wake word.

17. The tangible, non-transitory, computer-readable medium of claim 16, wherein the sound is captured via the first set of microphones and the second set of microphones concurrently.

18. The tangible, non-transitory, computer-readable medium of claim 16, wherein the first sound-data stream is produced using voice processing components in a first configuration, and wherein the second sound-data stream is produced using voice processing components in a second configuration.

19. The tangible, non-transitory, computer-readable medium of claim 16, further comprising:

transmitting, via a network interface of the playback device, at least a voice utterance to one or more remote servers following detection of the first wake word or the second wake word.

20. The tangible, non-transitory, computer-readable medium of claim 16, wherein at least one microphone is included in both the first set of microphones and the second set of microphones.

* * * * *